US009034268B2

(12) United States Patent
Bisaiji et al.

(10) Patent No.: US 9,034,268 B2
(45) Date of Patent: May 19, 2015

(54) EXHAUST PURIFICATION SYSTEM OF INTERNAL COMBUSTION ENGINE

(75) Inventors: Yuki Bisaiji, Mishima (JP); Kohei Yoshida, Gotemba (JP); Mikio Inoue, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 238 days.

(21) Appl. No.: 13/580,000

(22) PCT Filed: Nov. 7, 2011

(86) PCT No.: PCT/JP2011/075618
§ 371 (c)(1),
(2), (4) Date: Aug. 20, 2012

(87) PCT Pub. No.: WO2013/069088
PCT Pub. Date: May 16, 2013

(65) Prior Publication Data
US 2013/0115138 A1     May 9, 2013

(51) Int. Cl.
*B01D 50/00*     (2006.01)
*F01N 3/08*      (2006.01)
(Continued)

(52) U.S. Cl.
CPC ............ *F01N 3/0814* (2013.01); *F01N 3/0821* (2013.01); *F01N 3/0842* (2013.01);
(Continued)

(58) Field of Classification Search
CPC ..... F01N 3/0814; F01N 3/0842; F01N 13/02; F01N 3/2892; F01N 2330/30; F01N 2013/026; B01D 46/0024
USPC ............. 422/171, 177, 180; 60/295, 297, 301
See application file for complete search history.

(56) References Cited

U.S. PATENT DOCUMENTS

| 5,052,178 A | 10/1991 | Clerc et al. |
| 5,057,483 A | 10/1991 | Wan |

(Continued)

FOREIGN PATENT DOCUMENTS

| CN | 101454081 A | 6/2009 |
| CN | 101600860 A | 12/2009 |

(Continued)

OTHER PUBLICATIONS

International Search Report issued in International Patent Application No. PCT/JP2011/075618 dated Dec. 27, 2011.

(Continued)

*Primary Examiner* — Tom P Duong
(74) *Attorney, Agent, or Firm* — Oliff PLC

(57) ABSTRACT

An internal combustion engine wherein a hydrocarbon feed valve (15) and an exhaust purification catalyst (13) are arranged inside of an engine exhaust passage. At the time of engine operation, the amount of injection of hydrocarbons from the hydrocarbon feed valve (15) is controlled so that an amplitude of change of concentration of hydrocarbons which flow into the exhaust purification catalyst (13) becomes within a predetermined range of amplitude, and the injection period of hydrocarbons from the hydrocarbon feed valve (15) is controlled so that a concentration of hydrocarbons which flow into the exhaust purification catalyst (13) vibrates within a predetermined range of period. The exhaust purification catalyst (13) is formed so that a deposition ability of hydrocarbons to a downstream side part of the exhaust purification catalyst (13) becomes higher than a deposition ability of hydrocarbons to an upstream side part of the exhaust purification catalyst (13).

15 Claims, 17 Drawing Sheets

(51) Int. Cl.
  *F01N 3/28* (2006.01)
  *F01N 9/00* (2006.01)
  *B01D 53/94* (2006.01)
  *F01N 13/00* (2010.01)

(52) U.S. Cl.
  CPC ............ *F01N3/0871* (2013.01); *F01N 3/2825* (2013.01); *F01N 3/2832* (2013.01); *F01N 9/00* (2013.01); *F01N 2240/30* (2013.01); *F01N 2370/02* (2013.01); *F01N 2370/04* (2013.01); *F01N 2510/0682* (2013.01); *Y02T 10/47* (2013.01); *B01D 53/9422* (2013.01); *B01D 2251/208* (2013.01); *B01D 2255/1021* (2013.01); *B01D 2255/1023* (2013.01); *B01D 2255/1025* (2013.01); *B01D 2255/104* (2013.01); *B01D 2255/2022* (2013.01); *B01D 2255/2027* (2013.01); *B01D 2255/2042* (2013.01); *B01D 2255/2045* (2013.01); *B01D 2255/20738* (2013.01); *B01D 2255/20761* (2013.01); *B01D 2255/2092* (2013.01); *B01D 2255/9032* (2013.01); *B01D 2255/9037* (2013.01); *B01D 2255/91* (2013.01); *B01D 2255/912* (2013.01); *F01N 13/0097* (2014.06); *F01N 13/009* (2014.06)

(56) References Cited

U.S. PATENT DOCUMENTS

| | | |
|---|---|---|
| 5,075,274 A | 12/1991 | Kiyohide et al. |
| 5,402,641 A | 4/1995 | Katoh et al. |
| 5,882,607 A | 3/1999 | Miyadera et al. |
| 6,109,024 A | 8/2000 | Kinugasa et al. |
| 6,327,851 B1 | 12/2001 | Bouchez et al. |
| 6,413,483 B1 | 7/2002 | Brisley et al. |
| 6,477,834 B1 | 11/2002 | Asanuma et al. |
| 6,667,018 B2 | 12/2003 | Noda et al. |
| 6,813,882 B2 | 11/2004 | Hepburn et al. |
| 6,854,264 B2 | 2/2005 | Elwart et al. |
| 6,877,311 B2 | 4/2005 | Uchida |
| 6,983,589 B2 | 1/2006 | Lewis et al. |
| 7,063,642 B1 | 6/2006 | Hu et al. |
| 7,073,325 B2 | 7/2006 | Nakatani et al. |
| 7,082,753 B2 | 8/2006 | Dalla Betta et al. |
| 7,111,456 B2 | 9/2006 | Yoshida et al. |
| 7,137,379 B2 | 11/2006 | Sasaki et al. |
| 7,146,800 B2 | 12/2006 | Toshioka et al. |
| 7,165,393 B2 | 1/2007 | Betta et al. |
| 7,299,625 B2 | 11/2007 | Uchida et al. |
| 7,332,135 B2 * | 2/2008 | Gandhi et al. ................ 422/177 |
| 7,412,823 B2 | 8/2008 | Reuter et al. |
| 7,454,900 B2 | 11/2008 | Hayashi |
| 7,484,504 B2 | 2/2009 | Kato et al. |
| 7,506,502 B2 | 3/2009 | Nakano et al. |
| 7,549,284 B2 | 6/2009 | Iihoshi et al. |
| 7,703,275 B2 | 4/2010 | Asanuma et al. |
| 7,707,821 B1 | 5/2010 | Legare |
| 7,861,516 B2 | 1/2011 | Allansson et al. |
| 8,099,950 B2 | 1/2012 | Kojima et al. |
| 8,215,101 B2 | 7/2012 | Tsujimoto et al. |
| 8,261,532 B2 | 9/2012 | Fukuda et al. |
| 8,281,569 B2 | 10/2012 | Handa et al. |
| 8,434,296 B2 | 5/2013 | Wada et al. |
| 8,572,950 B2 | 11/2013 | Bisaiji et al. |
| 8,656,706 B2 | 2/2014 | Umemoto et al. |
| 8,671,667 B2 | 3/2014 | Bisaiji et al. |
| 8,679,410 B2 | 3/2014 | Umemoto et al. |
| 8,689,543 B2 | 4/2014 | Numata et al. |
| 8,695,325 B2 | 4/2014 | Bisaiji et al. |
| 2001/0052232 A1 | 12/2001 | Hoffmann et al. |
| 2002/0029564 A1 | 3/2002 | Roth et al. |
| 2003/0010020 A1 | 1/2003 | Taga et al. |
| 2003/0040432 A1 | 2/2003 | Beall et al. |
| 2003/0101713 A1 | 6/2003 | Betta et al. |
| 2004/0045285 A1 | 3/2004 | Penetrante et al. |
| 2004/0050037 A1 | 3/2004 | Betta et al. |
| 2004/0055285 A1 | 3/2004 | Rohr et al. |
| 2004/0154288 A1 | 8/2004 | Okada et al. |
| 2004/0175305 A1 | 9/2004 | Nakanishi et al. |
| 2004/0187477 A1 | 9/2004 | Okugawa et al. |
| 2005/0135977 A1 | 6/2005 | Park et al. |
| 2005/0147541 A1 | 7/2005 | Ajisaka et al. |
| 2006/0053778 A1 * | 3/2006 | Asanuma et al. ................ 60/295 |
| 2006/0107657 A1 | 5/2006 | Bernler et al. |
| 2006/0153761 A1 | 7/2006 | Bandl-Konrad et al. |
| 2006/0286012 A1 | 12/2006 | Socha et al. |
| 2007/0016357 A1 | 1/2007 | Nakagawa et al. |
| 2007/0028601 A1 | 2/2007 | Duvinage et al. |
| 2007/0059223 A1 | 3/2007 | Golunski et al. |
| 2007/0089403 A1 | 4/2007 | Pfeifer et al. |
| 2007/0125073 A1 | 6/2007 | Reuter et al. |
| 2007/0151232 A1 | 7/2007 | Dalla Betta et al. |
| 2008/0022662 A1 | 1/2008 | Yan |
| 2008/0053073 A1 | 3/2008 | Kalyanaraman et al. |
| 2008/0102010 A1 | 5/2008 | Bruck et al. |
| 2008/0120963 A1 | 5/2008 | Morita et al. |
| 2008/0148711 A1 | 6/2008 | Takubo |
| 2008/0154476 A1 | 6/2008 | Takubo |
| 2008/0196398 A1 | 8/2008 | Yan |
| 2008/0223020 A1 | 9/2008 | Yoshida et al. |
| 2008/0276602 A1 | 11/2008 | McCabe et al. |
| 2009/0000277 A1 | 1/2009 | Yoshida et al. |
| 2009/0049824 A1 | 2/2009 | Kojima et al. |
| 2009/0049825 A1 | 2/2009 | Ohashi |
| 2009/0049826 A1 | 2/2009 | Toshioka et al. |
| 2009/0077948 A1 | 3/2009 | Mondori et al. |
| 2009/0084091 A1 | 4/2009 | Tsujimoto et al. |
| 2009/0118121 A1 * | 5/2009 | Sarai ................ 502/439 |
| 2009/0120072 A1 | 5/2009 | Dalla Betta et al. |
| 2009/0151332 A1 | 6/2009 | Toshioka et al. |
| 2009/0191108 A1 | 7/2009 | Blanchard et al. |
| 2009/0196811 A1 | 8/2009 | Yamashita et al. |
| 2009/0229251 A1 | 9/2009 | Kadowaki |
| 2009/0249768 A1 | 10/2009 | Asanuma et al. |
| 2009/0266057 A1 | 10/2009 | Tsujimoto et al. |
| 2009/0282809 A1 | 11/2009 | Toshioka |
| 2009/0288393 A1 | 11/2009 | Matsuno et al. |
| 2009/0313970 A1 | 12/2009 | Iida |
| 2010/0005873 A1 | 1/2010 | Katoh et al. |
| 2010/0055012 A1 | 3/2010 | Grisstede et al. |
| 2010/0107613 A1 | 5/2010 | Masuda et al. |
| 2010/0115923 A1 | 5/2010 | Tsujimoto et al. |
| 2010/0126148 A1 | 5/2010 | Morishima et al. |
| 2010/0132356 A1 | 6/2010 | Lee |
| 2010/0154387 A1 | 6/2010 | Shibata et al. |
| 2010/0233051 A1 | 9/2010 | Grisstede et al. |
| 2010/0236224 A1 | 9/2010 | Kumar et al. |
| 2010/0242459 A1 | 9/2010 | Tsujimoto et al. |
| 2011/0041486 A1 | 2/2011 | Kato et al. |
| 2011/0047984 A1 | 3/2011 | Lee et al. |
| 2011/0047988 A1 | 3/2011 | Lewis et al. |
| 2011/0113754 A1 | 5/2011 | Kohara et al. |
| 2011/0120100 A1 | 5/2011 | Yin et al. |
| 2011/0131952 A1 | 6/2011 | Onodera et al. |
| 2011/0173950 A1 | 7/2011 | Wan et al. |
| 2011/0209459 A1 | 9/2011 | Hancu et al. |
| 2012/0122660 A1 | 5/2012 | Andersen et al. |
| 2012/0124967 A1 | 5/2012 | Yang et al. |
| 2012/0124971 A1 | 5/2012 | Bisaiji et al. |
| 2012/0131908 A1 | 5/2012 | Bisaiji et al. |
| 2013/0000284 A1 | 1/2013 | Bisaiji et al. |
| 2013/0011302 A1 | 1/2013 | Bisaiji et al. |
| 2013/0022512 A1 | 1/2013 | Bisaiji et al. |

FOREIGN PATENT DOCUMENTS

| | | |
|---|---|---|
| EP | 1 033 479 A2 | 9/2000 |
| EP | 1 273 337 A1 | 1/2003 |
| EP | 1 371 415 A1 | 12/2003 |
| EP | 1 519 015 A2 | 3/2005 |
| EP | 1 710 407 A1 | 10/2006 |

(56) References Cited

FOREIGN PATENT DOCUMENTS

| | | |
|---|---|---|
| EP | 1 793 099 A1 | 6/2007 |
| EP | 1 911 506 A1 | 4/2008 |
| EP | 1 936 164 A1 | 6/2008 |
| EP | 1 965 048 A1 | 9/2008 |
| EP | 2 063 078 A1 | 5/2009 |
| EP | 2 149 684 A1 | 2/2010 |
| EP | 2 239 432 | 10/2010 |
| EP | 2 460 989 A1 | 6/2012 |
| JP | A-04-200637 | 7/1992 |
| JP | A-H08-117601 | 5/1996 |
| JP | A-09-004437 | 1/1997 |
| JP | A-09-220440 | 8/1997 |
| JP | A-11-30117 | 2/1999 |
| JP | A-11-062559 | 3/1999 |
| JP | A-11-081994 | 3/1999 |
| JP | A-2000-257419 | 9/2000 |
| JP | A-2002-188429 | 7/2002 |
| JP | A-2004-016850 | 1/2004 |
| JP | A-2004-36543 | 2/2004 |
| JP | A-2004-216224 | 8/2004 |
| JP | A-2004-290965 | 10/2004 |
| JP | A-2004-308526 | 11/2004 |
| JP | A-2004-316458 | 11/2004 |
| JP | A-2005-61340 | 3/2005 |
| JP | A-2005-113801 | 4/2005 |
| JP | A-2005-171853 | 6/2005 |
| JP | A-2005-177738 | 7/2005 |
| JP | A-2006-501390 | 1/2006 |
| JP | A-2006-512529 | 4/2006 |
| JP | A-2006-342700 | 12/2006 |
| JP | A-2007-064167 | 3/2007 |
| JP | A-2007-514090 | 5/2007 |
| JP | A-2007-514104 | 5/2007 |
| JP | A-2007-154794 | 6/2007 |
| JP | B2-3969450 | 9/2007 |
| JP | A-2007-278120 | 10/2007 |
| JP | A-2008-002451 | 1/2008 |
| JP | A-2008-19760 | 1/2008 |
| JP | A-2008-69769 | 3/2008 |
| JP | A-2008-231926 | 10/2008 |
| JP | A-2008-232003 | 10/2008 |
| JP | A-2008-255858 | 10/2008 |
| JP | A-2008-267178 | 11/2008 |
| JP | A-2008-267217 | 11/2008 |
| JP | A-2008-286186 | 11/2008 |
| JP | A-2008-543559 | 12/2008 |
| JP | A-2009-30560 | 2/2009 |
| JP | A-2009-112967 | 5/2009 |
| JP | A-2009-114879 | 5/2009 |
| JP | A-2009-156067 | 7/2009 |
| JP | A-2009-165922 | 7/2009 |
| JP | A-2009-167973 | 7/2009 |
| JP | A-2009-168031 | 7/2009 |
| JP | A-2009-191823 | 8/2009 |
| JP | A-2009-221939 | 10/2009 |
| JP | A-2009-226349 | 10/2009 |
| JP | A-2009-243362 | 10/2009 |
| JP | A-2009-275631 | 11/2009 |
| JP | A-2009-275666 | 11/2009 |
| JP | A-2010-012459 | 1/2010 |
| JP | A-2010-048134 | 3/2010 |
| JP | A-2011-190803 | 9/2011 |
| JP | B1-4868097 | 2/2012 |
| WO | WO 2005/059324 | 6/2005 |
| WO | WO 2006/131825 | 12/2006 |
| WO | WO 2007/026229 | 3/2007 |
| WO | WO 2007/141638 | 12/2007 |
| WO | WO 2008/007810 | 1/2008 |
| WO | WO 2008/012653 | 1/2008 |
| WO | WO 2009/016822 | 2/2009 |
| WO | WO 2009/056958 | 5/2009 |
| WO | WO 2009/082035 | 7/2009 |
| WO | WO 2011/114499 A1 | 9/2011 |
| WO | WO 2011/114501 | 9/2011 |
| WO | WO 2011/118044 | 9/2011 |

OTHER PUBLICATIONS

Written Opinion issued in International Patent Application No. PCT/JP2011/075618 dated Dec. 27, 2011.
U.S. Appl. No. 13/263,660, filed Oct. 7, 2011, in the name of Umemoto et al.
Office Action dated May 2, 2014 issued in U.S. Appl. No. 13/263,660.
Aug. 13, 2013 International Preliminary Report on Patentability issued in International Patent Application No. PCT/JP2011/053429 (with translation).
Aug. 8, 2013 Office Action issued in U.S. Appl. No. 13/258,483.
Feb. 6, 2014 Corrected Notice of Allowability issued in U.S. Appl. No. 13/202,694.
Dec. 21, 2010 International Search Report issued in International Patent Application No. PCT/JP2010/065449 (with translation).
Jun. 15, 2010 International Search Report issued in International Patent Application No. PCT/JP2010/054730 (with translation).
Nov. 22, 2010 International Search Report issued in International Patent Application No. PCT/JP2010/065186 (with translation).
Jan. 18, 2011 International Search Report issued in International Patent Application No. PCT/JP2010/067705.
Jan. 18, 2011 International Search Report issued in International Application No. PCT/JP2010/067707.
Jan. 18, 2011 International Search Report issued in International Patent Application No. PCT/JP2010/068785.
Jul. 14, 2014 Office Action issued in U.S. Appl. No. 13/262,001.
Jul. 14, 2014 Office Action issued in U.S. Appl. No. 13/264,884.
Jun. 16, 2014 Office Action issued in U.S. Appl. No. 13/581,186.
Jun. 18, 2014 Office Action issued in U.S. Appl. No. 13/582,909.
Jun. 19, 2014 Office Action issued in U.S. Appl. No. 13/264,594.
Jun. 21, 2011 International Search Report issued in International Patent Application No. PCT/JP2011/059880 (with translation).
Jun. 23, 2014 Office Action issued in U.S. Appl. No. 13/262,858.
Jun. 29, 2010 International Search Report issued in International Patent Application No. PCT/JP2010/055303 (with translation).
Mar. 15, 2011 International Search Report issued in International Patent Application No. PCT/JP2011/053429 (with translation).
Mar. 22, 2011 International Search Report issued in International Patent Application No. PCT/JP2010/073645 (with translation).
Mar. 22, 2011 International Search Report issued in International Patent Application No. PCT/JP2010/072299 (with translation).
Mar. 8, 2011 International Search Report issued in International Patent Application No. PCT/JP2011/052969 (with translation).
May 15, 2013 Office Action in U.S. Appl. No. 13/202,694.
May 17, 2011 International Search Report issued in International Patent Application No. PCT/JP2011/057264.
Mar. 28, 2014 Notice of Allowance issued in U.S. Appl. No. 13/582,862.
Mar. 4, 2014 Notice of Allowance issued in U.S. Appl. No. 13/255,786.
Nov. 13, 2013 Notice of Allowance issued in U.S. Appl. No. 13/202,692.
Oct. 17, 2013 Notice of Allowance issued in U.S. Appl. No. 13/202,694.
Nov. 22, 2010 International Search Report issued in International Patent Application No. PCT/JP2010/065187.
Nov. 26, 2012 Office Action issued in U.S. Appl. No. 13/202,694.
Oct. 26, 2010 International Search Report issued in International Patent Application No. PCT/JP2010/063135.
Oct. 26, 2012 Office Action issued in U.S. Appl. No. 13/202,692.
Oct. 23, 2013 Office Action issued in U.S. Appl. No. 13/263,272.
Apr. 23, 2014 Office Action issued in U.S. Appl. No. 13/260,986.
Apr. 3, 2014 Office Action issued in U.S. Appl. No. 13/259,574.
Dec. 20, 2013 Office Action issued in U.S. Appl. No. 13/264,230.
Jul. 1, 2014 Office Action issued in U.S. Appl. No. 13/257,789.
Jul. 24, 2013 Office Action issued in U.S. Appl. No. 13/202,692.
May 7, 2014 Office Action issued in U.S. Appl. No. 13/264,062.
May 8, 2014 Office Action issued in U.S. Appl. No. 13/375,674.
U.S. Appl. No. 13/202,692 in the name of Umemoto et al., filed Sep. 20, 2011.
U.S. Appl. No. 13/202,733 in the name of Bisaui et al., filed Sep. 30, 2011.

(56) References Cited

OTHER PUBLICATIONS

U.S. Appl. No. 13/257,789 in the name of Nishioka et al., filed Oct. 14, 2011.
U.S. Appl. No. 13/258,483 in the name of Numata et al., filed Sep. 22, 2011.
U.S. Appl. No. 13/259,574 in the name of Tsukamoto et al., filed Sep. 23, 2011.
U.S. Appl. No. 13/259,885 in the name of Umemoto et al., filed Sep. 23, 2011.
U.S. Appl. No. 13/260,986 in the name of W Atanabe et al., filed Sep. 29, 2011.
U.S. Appl. No. 13/262,858 in the name of Bisaiji et al., filed Oct. 4, 2011.
U.S. Appl. No. 13/263,272 in the name of Bisaiji et al., filed Oct. 6, 2011.
U.S. Appl. No. 13/264,062 in the name of Watanabe et al., filed Oct. 12, 2011.
U.S. Appl. No. 13/264,230 in the name of Bisadi et al., filed Oct. 13, 2011.
U.S. Appl. No. 13/264,594 in the name of Inoue et al., filed Oct. 14, 2011.
U.S. Appl. No. 13/264,884 in the name of Bisaiji et al., filed Oct. 17, 2011.
U.S. Appl. No. 13/375,674 in the name of Inoue et al., filed Dec. 1, 2011.
U.S. Appl. No. 13/578,148 in the name of Umemoto et al., filed Aug. 9, 2012.
U.S. Appl. No. 13/58,186 in the name of Kazuhiro Umemoto et al., filed Aug. 24, 2012.
U.S. Appl. No. 13/582,862 in the name of Uenishi et al., filed Sep. 5, 2012.
U.S. Appl. No. 13/582,909 in the name of Kazuhiro Umemoto et al., filed Sep. 5, 2012.
U.S. Patent Application No. 131202,694 in the name of Bisaui et al., filed Sep. 19, 2011.
U.S. Appl. No. 14/108,113 in the name of Bisaiji et al., filed Dec. 16, 2013.
U.S. Appl. No. 14/152,629 in the name of Umemoto et al., filed Jan. 10, 2014.
U.S. Appl. No. 13/262,001 in the name of Inoue, et al., filed Oct. 19, 2011.
Nov. 22, 2010 Written Opinion issued in International Patent Application No. PCT/JP2010/065186 (with translation).
Aug. 6, 2014 Notice of Allowance in U.S. Appl. No. 13/259,574.
Nov. 27, 2013 Notice of Allowance issued in U.S. Appl. No. 13/258,483.
Oct. 4, 2013 Notice of Allowance issued in U.S. Appl. No. 13/259,885.
Jun. 15, 2010 International Search Report issued in PCT/JP2010/0547-40 (with translation).
Jun. 15, 2010 Written Opinion issued in PCT/JP2010/054740 (with translation).
Jun. 20, 2012 Search Report issued in European Patent Application No. 10845966.0.
Jun. 15, 2010 International Search Report issued in International Application No. PCT/JP2010/054731 (with translation).
Jun. 29, 2010 International Search Report issued in International Patent Application No. PCT/JP2010/056345.
Apr. 4, 2013 Office Action issued in U.S. Appl. No. 13/255,710.
U.S. Appl. No. 13/255,774 in the name of Bisaiji et al., filed Sep. 22, 2011.
U.S. Appl. No. 13/255,710 in the name of Bisaiji et al., filed Oct. 12, 2011.
Oct. 24, 2013 Office Action issued in U.S. Appl. No. 13/255,710.
Jan. 17, 2013 Office Action issued in U.S. Appl. No. 13/202,733.
International Search Report dated Jun. 15, 2010 in International Application No. PCT/JP2010/054729.
International Search Report issued in International Application No. PCT/JP2011/066628 dated Sep. 13, 2011 (with Translation).
U.S. Appl. No. 13/502,210 in the name of Bisaiji et al., filed on Apr. 16. 2012.
U.S. Appl. No. 13/499,211 in the name of Bisaiji et al., filed Mar. 29, 2012.
Jan. 22, 2014 Office Action issued in U.S. Application No. 13/499,211.
May 27, 2014 Office Action issued in U.S. Appl. No. 13/255,710.
Sep. 18, 2014 Notice of Allowance issued in Application No. 13/255,710,.
U.S. Appl. No. 13/934,080 in the name of Bisaiji et al., filed Jul. 2, 2013.
Oct. 2, 2014 Office Action issued in U.S. Appl. No. 13/582,862.
Jul. 9, 2013 Notice of Allowance issued in U.S. Appl. No. 13/255,774.
Dec. 9, 2013 Notice of Allowance issued in U.S. Appl. No. 13/262,506.
Dec. 27, 2013 Notice of Allowance issued in U.S. Appl. No. 13/502,210.
U.S. Appl. No. 13/262,506 in the name of Bisaiji et al., filed Sep. 30, 2011.
U.S. Appl. No. in the name of Bisaiji et al., filed Oct. 13, 2011.
U.S. Appl. No. 13/202,694 in the name of Bisaiji et al., filed Sep. 19, 2011.
U.S. Appl. No. 13/202,733 in the name of Bisaiji et al., filed Sep. 30, 2011.
Dec. 22, 2014 Office Action issued in U.S. Appl. No. 13/264,230.

\* cited by examiner

Fig.1
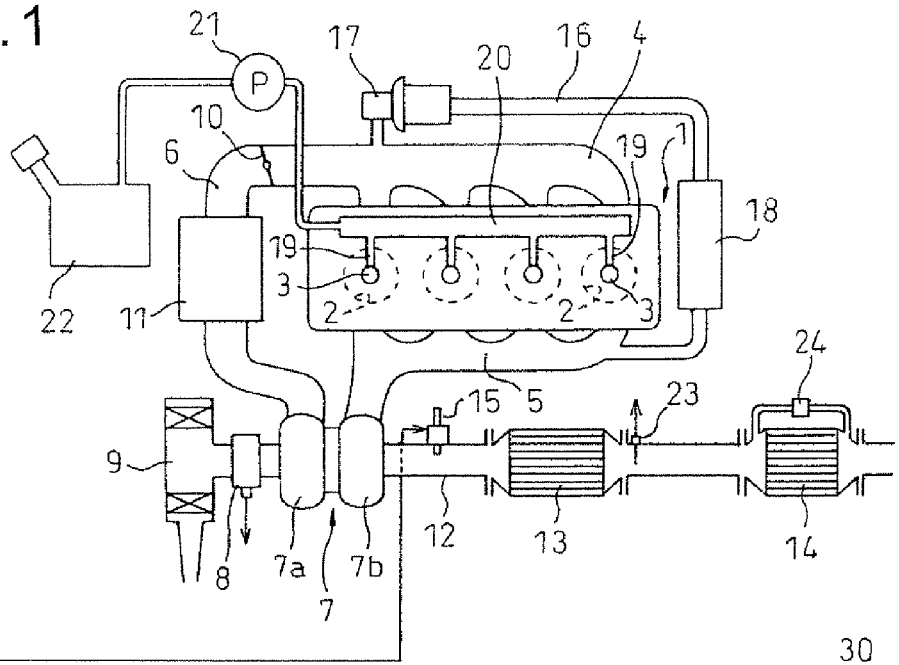
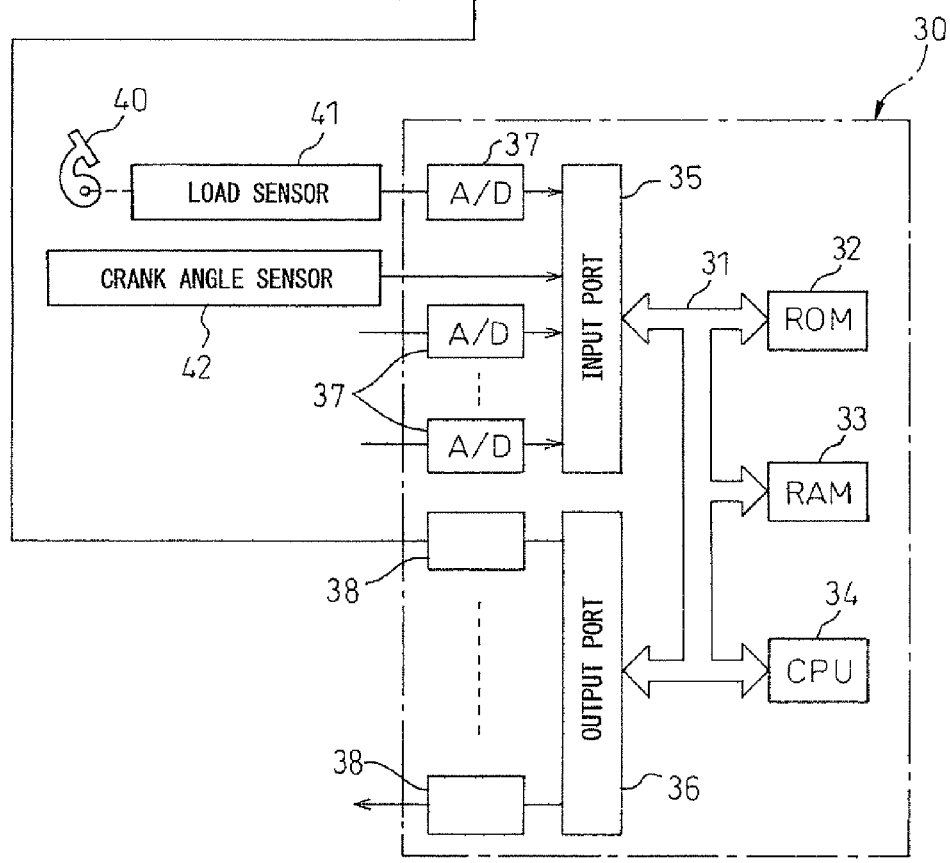

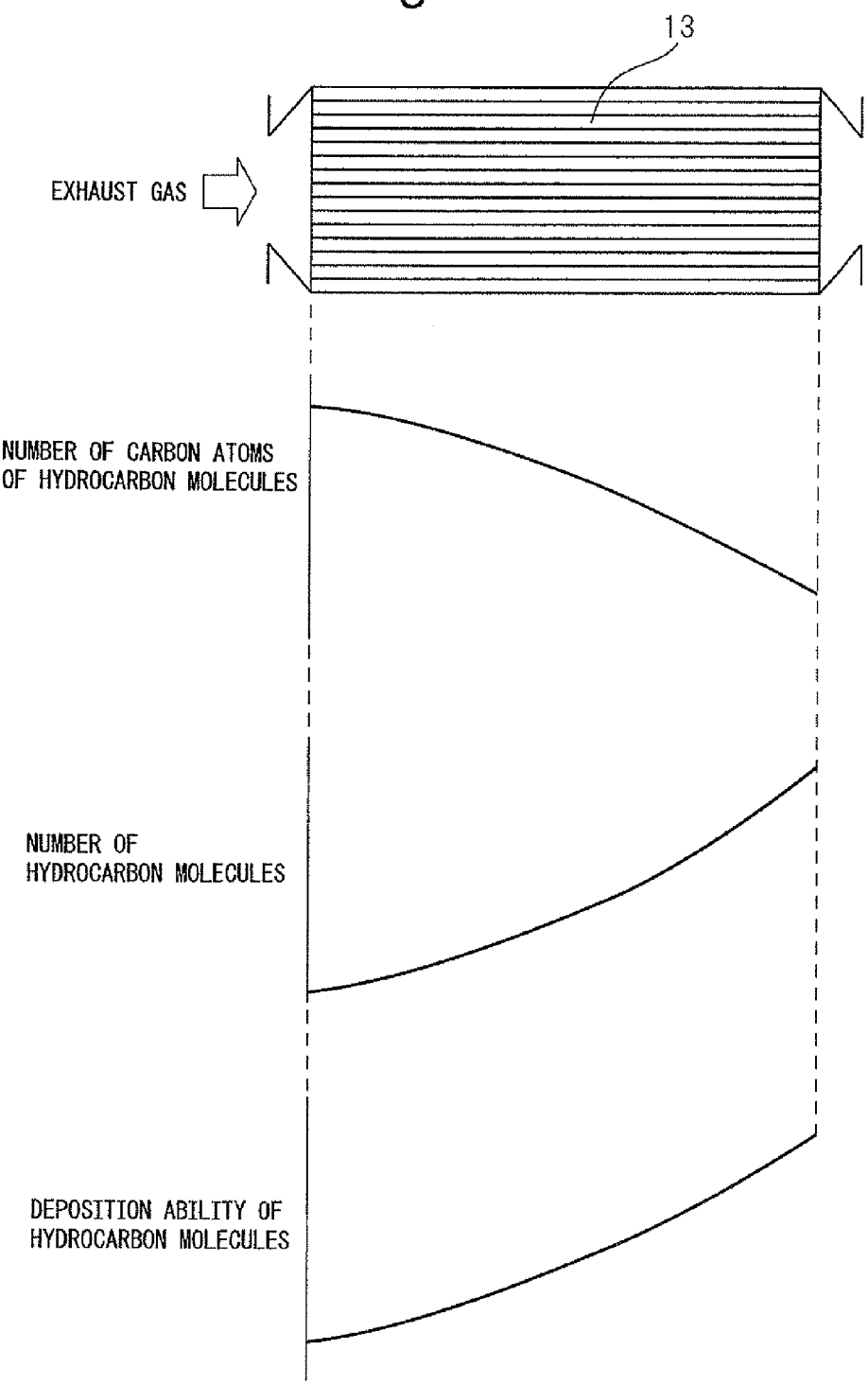

EXHAUST PURIFICATION SYSTEM OF INTERNAL COMBUSTION ENGINE

TECHNICAL FIELD

The present invention relates to an exhaust purification system of an internal combustion engine.

BACKGROUND ART

Known in the art is an internal combustion engine which arranges a hydrocarbon feed valve in an engine exhaust passage, which arranges an exhaust purification catalyst downstream of the hydrocarbon feed valve inside the engine exhaust passage, which carries precious metal catalysts on exhaust gas flow surfaces of the exhaust purification catalyst and is formed with basic exhaust gas flow surface parts around the precious metal catalysts, which injects hydrocarbons from the hydrocarbon feed valve by a predetermined period of within 5 seconds at the time of engine operation, and thereby removes the $NO_X$ which is contained in the exhaust gas (for example, see Patent Literature 1). In this internal combustion engine, even if the temperature of the exhaust purification catalyst becomes a high temperature, a high $NO_X$ purification rate can be obtained.

CITATIONS LIST

Patent Literature

Patent Literature 1: WO2011/114499A1

SUMMARY OF INVENTION

Technical Problem

In this internal combustion engine, even if the exhaust purification catalyst becomes high in temperature, a high $NO_X$ purification rate can be obtained, but obtaining a further higher $NO_X$ purification rate is desirable.

An object of the present invention is to provide an exhaust purification system of an internal combustion engine which enables a further high $NO_X$ purification rate to be obtained.

Solution to Problem

According to the present invention, there is provided an exhaust purification system of an internal combustion engine in which a hydrocarbon feed valve for feeding hydrocarbons is arranged in an engine exhaust passage, an exhaust purification catalyst for reacting $NO_X$ contained in an exhaust gas and reformed hydrocarbons is arranged in the engine exhaust passage downstream of the hydrocarbon feed valve, precious metal catalysts are carried on exhaust gas flow surfaces of the exhaust purification catalyst, basic exhaust gas flow surface parts are formed around the precious metal catalysts, the exhaust purification catalyst has a property of reducing the $NO_X$ which is contained in the exhaust gas if making a concentration of hydrocarbons which flow into the exhaust purification catalyst vibrate by within a predetermined range of amplitude and by within a predetermined range of period and has a property of being increased in storage amount of $NO_X$ which is contained in the exhaust gas if making a vibration period of the hydrocarbon concentration longer than the predetermined range, and, at the time of engine operation, an amount of injection of hydrocarbons from the hydrocarbon feed valve is controlled so that an amplitude of change of concentration of hydrocarbons which flow into the exhaust purification catalyst becomes within the above predetermined range of amplitude, and a period of injection of hydrocarbons from the hydrocarbon feed valve is controlled so that a concentration of hydrocarbons which flow into the exhaust purification catalyst becomes within the predetermined range of period, wherein the exhaust purification catalyst is formed so that a deposition ability of hydrocarbons to a downstream side part of the exhaust purification catalyst becomes higher than a deposition ability of hydrocarbons to an upstream side part of the exhaust purification catalyst.

Advantageous Effects of Invention

When the temperature of the exhaust purification catalyst is low of course and even when it is high, an extremely high $NO_X$ purification rate can be obtained.

BRIEF DESCRIPTION OF DRAWINGS

FIG. 1 is an overall view of a compression ignition type internal combustion engine.

FIG. 22 is a view for explaining a deposition ability of hydrocarbon molecules.

DESCRIPTION OF EMBODIMENTS

Figure 2:
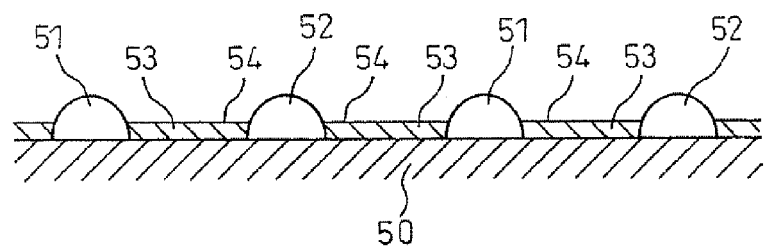
FIG. 2 is a view which schematically shows the surface part of a catalyst carrier.

FIG. 1 is an overall view of a compression ignition type internal combustion engine.

Referring to FIG. 1, 1 indicates an engine body, 2 a combustion chamber of each cylinder, 3 an electronically controlled fuel injector for injecting fuel into each combustion chamber 2, 4 an intake manifold, and 5 an exhaust manifold. The intake manifold 4 is connected through an intake duct 6 to an outlet of a compressor 7a of an exhaust turbocharger 7, while an inlet of the compressor 7a is connected through an intake air amount detector 8 to an air cleaner 9. Inside the intake duct 6, a throttle valve 10 which is driven by a step motor is arranged. Around the intake duct 6, a cooling device 11 is arranged for cooling the intake air which flows through the inside of the intake duct 6. In the embodiment which is shown in FIG. 1, the engine cooling water is guided to the inside of the cooling device 11 where the engine cooling water is used to cool the intake air.

On the other hand, the exhaust manifold 5 is connected to an inlet of an exhaust turbine 7b of the exhaust turbocharger 7. An outlet of the exhaust turbine 7b is connected through an exhaust pipe 12 to an inlet of an exhaust purification catalyst 13, while an outlet of the exhaust purification catalyst 13 is connected to an inlet of a particulate filter 14 for trapping particulate which is contained in the exhaust gas. Upstream of the exhaust purification catalyst 13 inside the exhaust pipe 12, a hydrocarbon feed valve 15 is arranged for feeding hydrocarbons comprised of diesel oil or other fuel used as fuel for a compression ignition type internal combustion engine. In the embodiment shown in FIG. 1, diesel oil is used as the hydrocarbons which are fed from the hydrocarbon feed valve 15. Note that, the present invention can also be applied to a spark ignition type internal combustion engine in which fuel is burned under a lean air-fuel ratio. In this case, from the hydrocarbon feed valve 15, hydrocarbons comprised of gasoline or other fuel used as fuel of a spark ignition type internal combustion engine are fed.

On the other hand, the exhaust manifold 5 and the intake manifold 4 are connected with each other through an exhaust gas recirculation (hereinafter referred to as an "EGR") passage 16. Inside the EGR passage 16, an electronically controlled EGR control valve 17 is arranged. Further, around the EGR passage 16, a cooling device 18 is arranged for cooling the EGR gas which flows through the inside of the EGR passage 16. In the embodiment which is shown in FIG. 1, the engine cooling water is guided to the inside of the cooling device 18 where the engine cooling water is used to cool the EGR gas. On the other hand, each fuel injector 3 is connected through a fuel feed tube 19 to a common rail 20. This common rail 20 is connected through an electronically controlled variable discharge fuel pump 21 to a fuel tank 22. The fuel which is stored inside of the fuel tank 22 is fed by the fuel pump 21 to the inside of the common rail 20. The fuel which is fed to the inside of the common rail 21 is fed through each fuel feed tube 19 to the fuel injector 3.

An electronic control unit 30 is comprised of a digital computer provided with a ROM (read only memory) 32, a RAM (random access memory) 33, a CPU (microprocessor) 34, an input port 35, and an output port 36, which are connected with each other by a bidirectional bus 31. Downstream of the exhaust purification catalyst 13, a temperature sensor 23 is arranged for detecting the temperature of the exhaust purification catalyst 13. The particulate filter 14 has a differential pressure sensor 24 attached to it for detecting the differential pressure before and after the particulate filter 14. The output signals of these temperature sensor 23, differential pressure sensor 24, and intake air amount detector 8 are input through respectively corresponding AD converters 37 to the input port 35. Further, an accelerator pedal 40 has a load sensor 41 connected to it which generates an output voltage proportional to the amount of depression L of the accelerator pedal 40. The output voltage of the load sensor 41 is input through a corresponding AD converter 37 to the input port 35. Furthermore, at the input port 35, a crank angle sensor 42 is connected which generates an output pulse every time a crankshaft rotates by, for example, 15°. On the other hand, the output port 36 is connected through corresponding drive circuits 38 to each fuel injector 3, the step motor for driving the throttle valve 10, hydrocarbon feed valve 15, EGR control valve 17, and fuel pump 21.

FIG. 2 schematically shows a surface part of a catalyst carrier which is carried on a substrate of the exhaust purification catalyst 13. At this exhaust purification catalyst 13, as shown in FIG. 2, for example, there is provided a catalyst carrier 50 made of alumina on which precious metal catalysts 51 and 52 are carried. Furthermore, on this catalyst carrier 50, a basic layer 53 is formed which includes at least one element selected from potassium K, sodium Na, cesium Cs, or another such alkali metal, barium Ba, calcium Ca, or another such alkali earth metal, a lanthanide or another such rare earth and silver Ag, copper Cu, iron Fe, iridium Ir, or another metal able to donate electrons to $NO_X$. The exhaust gas flows along the top of the catalyst carrier 50, so the precious metal catalysts 51 and 52 can be said to be carried on the exhaust gas flow surfaces of the exhaust purification catalyst 13. Further, the surface of the basic layer 53 exhibits basicity, so the surface of the basic layer 53 is called the "basic exhaust gas flow surface parts 54".

On the other hand, in FIG. 2, the precious metal catalyst 51 is comprised of platinum Pt, while the precious metal catalyst 52 is comprised of rhodium Rh. Note that, in this case, both the precious metal catalysts 51 and 52 may be comprised from platinum Pt. Further, on the catalyst carrier 50 of the exhaust purification catalyst 13, in addition to platinum Pt and rhodium Rh, palladium Pd may be further carried or, instead of rhodium Rh, palladium Pd may be carried. That is, the precious metal catalysts 51 and 52 which are carried on the catalyst carrier 50 are comprised of at least one of platinum Pt, rhodium Rh and palladium Pd.

Figure 3:
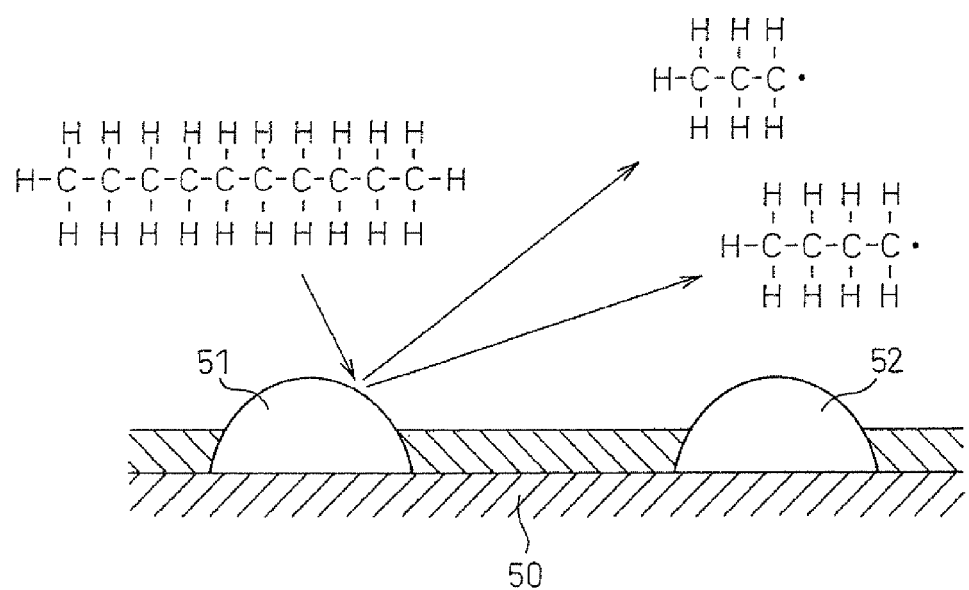
FIG. 3 is a view for explaining an oxidation reaction at an exhaust purification catalyst.

If hydrocarbons are injected from the hydrocarbon feed valve 15 into the exhaust gas, the hydrocarbons are reformed by the exhaust purification catalyst 13. In the present invention, at this time, the reformed hydrocarbons are used to remove the $NO_X$ at the exhaust purification catalyst 13. FIG. 3 schematically shows the reformation action performed at the exhaust purification catalyst 13 at this time. As shown in FIG. 3, the hydrocarbons HC which are injected from the hydrocarbon feed valve 15 become radical hydrocarbons HC with a small carbon number due to the catalyst 51.

Figure 4:
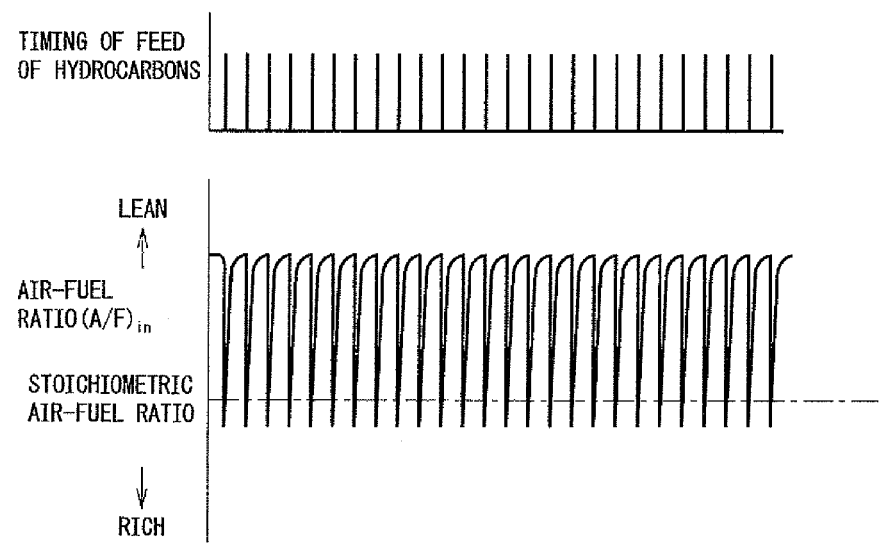
FIG. 4 is a view which shows changes in an air-fuel ratio of exhaust gas which flows into an exhaust purification catalyst.

FIG. 4 shows the feed timing of hydrocarbons from the hydrocarbon feed valve 15 and the change in the air-fuel ratio (A/F)in of the exhaust gas which flows into the exhaust purification catalyst 13. Note that, the change in the air-fuel ratio (A/F)in depends on the change in concentration of the hydrocarbons in the exhaust gas which flows into the exhaust purification catalyst 13, so it can be said that the change in the air-fuel ratio (A/F)in shown in FIG. 4 expresses the change in concentration of the hydrocarbons. However, if the hydrocarbon concentration becomes higher, the air-fuel ratio (A/F)in becomes smaller, so, in FIG. 4, the more to the rich side the air-fuel ratio (A/F)in becomes, the higher the hydrocarbon concentration.

Figure 5:
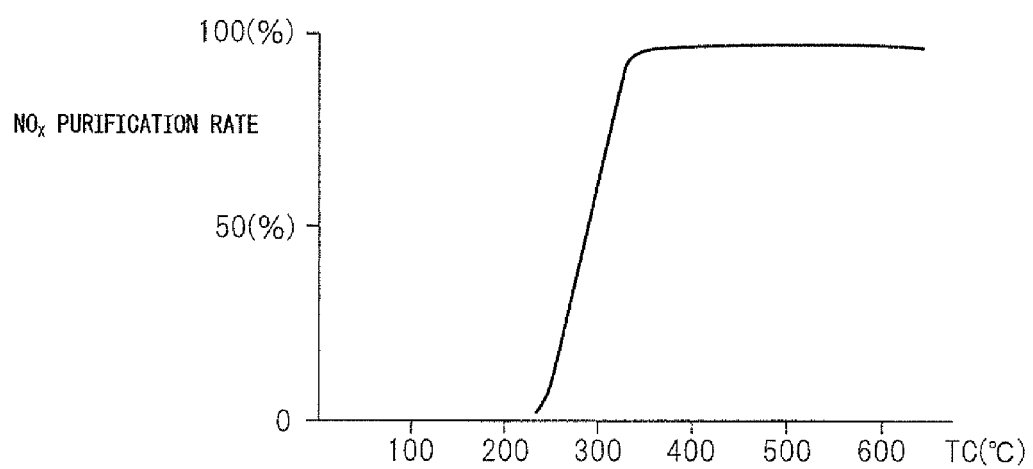
FIG. 5 is a view which shows an $NO_X$ purification rate.

FIG. 5 shows the $NO_X$ purification rate by the exhaust purification catalyst 13 with respect to the catalyst temperatures TC of the exhaust purification catalyst 13 when periodically making the concentration of hydrocarbons which flow into the exhaust purification catalyst 13 change so as to, as shown in FIG. 4, make the air-fuel ratio (A/F)in of the exhaust gas flowing to the exhaust purification catalyst 13 change. The inventors engaged in research relating to $NO_X$ purification for a long time. In the process of research, they learned that if making the concentration of hydrocarbons which flow into the exhaust purification catalyst 13 vibrate by within a predetermined range of amplitude and within a predetermined range of period, as shown in FIG. 5, an extremely high $NO_X$ purification rate is obtained even in a 400° C. or higher high temperature region.

Figure 6A:
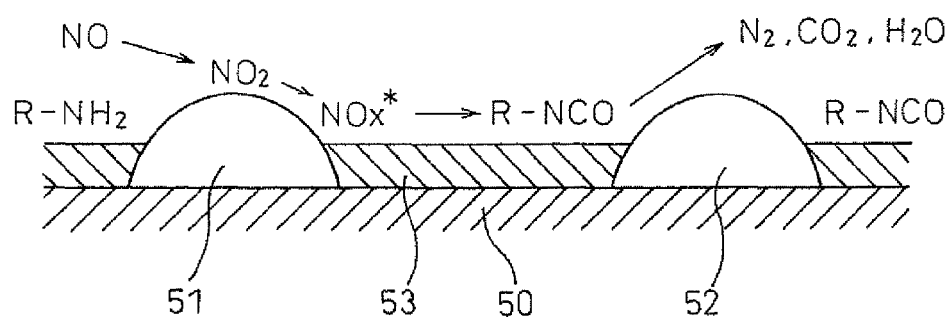
FIGS. 6A and 6B are views for explaining an oxidation reduction reaction in an exhaust purification catalyst.

Furthermore, it is learned that at this time, a large amount of reducing intermediates which contain nitrogen and hydrocarbons continues to be held or adsorbed on the surface of the basic layer 53, that is, on the basic exhaust gas flow surface parts 54 of the exhaust purification catalyst 13, and the reducing intermediates play a central role in obtaining a high $NO_X$ purification rate. Next, this will be explained with reference to FIGS. 6A and 68. Note that, these FIGS. 6A and 68 schematically show the surface part of the catalyst carrier 50 of the exhaust purification catalyst 13. These FIGS. 6A and 68 show the reaction which is presumed to occur when the concentration of hydrocarbons which flow into the exhaust purification catalyst 13 is made to vibrate by within a predetermined range of amplitude and within a predetermined range of period.

Figure 6B:
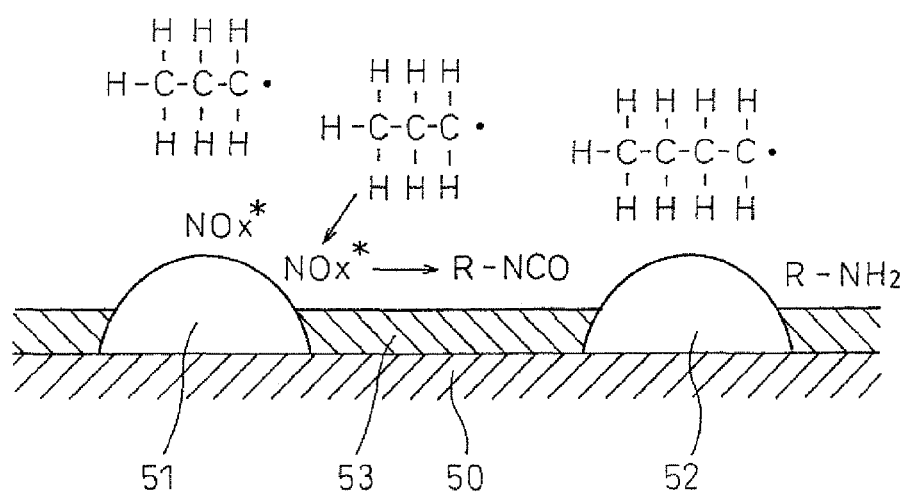

FIG. 6A shows when the concentration of hydrocarbons which flow into the exhaust purification catalyst 13 is low, while FIG. 6B shows when hydrocarbons are fed from the hydrocarbon feed valve 15 and the concentration of hydrocarbons which flow into the exhaust purification catalyst 13 becomes higher.

Now, as will be understood from FIG. 4, the air-fuel ratio of the exhaust gas which flows into the exhaust purification catalyst 13 is maintained lean except for an instant, so the exhaust gas which flows into the exhaust purification catalyst 13 normally becomes a state of oxygen excess. At this time, part of the NO which is contained in the exhaust gas deposits on the exhaust purification catalyst 13, while part of the NO which is contained in the exhaust gas, as shown in FIG. 6A, is oxidized on the platinum 51 and becomes $NO_2$. Next, this $NO_2$ is further oxidized and becomes $NO_3$. Further, part of the $NO_2$ becomes $NO_2^-$. Therefore, on the platinum Pt 51, $NO_2^-$ and $NO_3$ are produced. The NO which is deposited on the exhaust purification catalyst 13 and the $NO_2^-$ and $NO_3$ which are formed on the platinum Pt 51 are strong in activity. Therefore, below, these NO, $NO_2^-$, and $NO_3$ will be referred to as the "active $NO_X^*$".

On the other hand, if hydrocarbons are fed from the hydrocarbon feed valve 15, the hydrocarbons successively deposit over the entire exhaust purification catalyst 13. The majority of the deposited hydrocarbons successively react with oxygen and are burned. Part of the deposited hydrocarbons are successively reformed and become radicalized inside of the exhaust purification catalyst 13 as shown in FIG. 3. Therefore, as shown in FIG. 6B, the hydrogen concentration around the active $NO_X^*$ becomes higher. In this regard, if, after the active $NO_X^*$ is produced, the state of a high oxygen concentration around the active $NO_X^*$ continues for a constant time or more, the active $NO_X^*$ is oxidized and is absorbed in the form of nitrate ions $NO_3^-$ inside the basic layer 53. However, if, before this constant time elapses, the hydrocarbon concentration around the active $NO_X^*$ becomes higher, as shown in FIG. 6B, the active $NO_X^*$ reacts on the platinum 51 with the radical hydrocarbons HC to thereby form the reducing intermediates. The reducing intermediates are adhered or adsorbed on the surface of the basic layer 53.

Note that, at this time, the first produced reducing intermediate is considered to be a nitro compound R—$NO_2$. If this nitro compound R—$NO_2$ is produced, the result becomes a nitrile compound R—CN, but this nitrile compound R—CN can only survive for an instant in this state, so immediately becomes an isocyanate compound R—NCO. This isocyanate compound R—NCO becomes an amine compound R—$NH_2$ if hydrolyzed. However, in this case, what is hydrolyzed is considered to be part of the isocyanate compound R—NCO. Therefore, as shown in FIG. 6B, the majority of the reducing intermediates which are held or adsorbed on the surface of the basic layer 53 is believed to be the isocyanate compound R—NCO and amine compound R—$NH_2$.

On the other hand, as shown in FIG. 6B, if the produced reducing intermediates are surrounded by the hydrocarbons HC, the reducing intermediates are blocked by the hydrocarbons HC and the reaction will not proceed any further. In this case, if the concentration of hydrocarbons which flow into the exhaust purification catalyst 13 is lowered and then the hydrocarbons which are deposited around the reducing intermediates will be oxidized and consumed, and thereby the concentration of oxygen around the reducing intermediates becomes higher, the reducing intermediates react with the active $NO_X^*$ as shown in FIG. 6A, react with the surrounding oxygen, or break down on their own. Due to this, the reducing intermediates R—NCO and R—$NH_2$ are converted to $N_2$, $CO_2$, and $H_2O$, therefore the $NO_X$ is removed.

In this way, in the exhaust purification catalyst 13, when the concentration of hydrocarbons which flow into the exhaust purification catalyst 13 is made higher, reducing intermediates are produced, and after the concentration of hydrocarbons which flow into the exhaust purification catalyst 13 is lowered, when the oxygen concentration is raised, the reducing intermediates react with the active $NO_X^*$ or oxygen or break down on their own whereby the $NO_X$ is removed. That is, in order for the exhaust purification catalyst 13 to remove the $NO_X$, the concentration of hydrocarbons which flow into the exhaust purification catalyst 13 has to be periodically changed.

Of course, in this case, it is necessary to raise the hydrocarbon concentration to a concentration sufficiently high for producing the reducing intermediates and it is necessary to lower the hydrocarbon concentration to a concentration sufficiently low for making the produced reducing intermediates react with the active $NO_X^*$ or oxygen or break down on their own. That is, it is necessary to make the concentration of hydrocarbons which flow into the exhaust purification catalyst 13 vibrate by within a predetermined range of amplitude.

Note that, in this case, it is necessary to hold these reducing intermediates on the basic layer 53, that is, the basic exhaust gas flow surface parts 54, until the produced reducing intermediates R—NCO and R—NH$_2$ react with the active NO$_X$* or oxygen or break down themselves. For this reason, the basic exhaust gas flow surface parts 54 are provided.

On the other hand, if lengthening the feed period of the hydrocarbons, the time until the oxygen concentration becomes higher becomes longer in the period after the hydrocarbons are fed until the hydrocarbons are next fed. Therefore, the active NO$_X$* is absorbed in the basic layer 53 in the form of nitrates without producing reducing intermediates. To avoid this, it is necessary to make the concentration of hydrocarbons which flow into the exhaust purification catalyst 13 vibrate by within a predetermined range of period.

Therefore, in this embodiment of the present invention, to react the NO$_X$ contained in the exhaust gas and the reformed hydrocarbons and produce the reducing intermediates R—NCO and R—NH$_2$ containing nitrogen and hydrocarbons, the precious metal catalysts 51 and 52 are carried on the exhaust gas flow surfaces of the exhaust purification catalyst 13. To hold the produced reducing intermediates R—NCO and R—NH$_2$ inside the exhaust purification catalyst 13, the basic exhaust gas flow surface parts 54 are formed around the precious metal catalysts 51 and 52. The reducing intermediates R—NCO and R—NH$_2$ which are held on the basic exhaust gas flow surface parts 54 are converted to N$_2$, CO$_2$, and H$_2$O. The vibration period of the hydrocarbon concentration is made the vibration period required for continuation of the production of the reducing intermediates R—NCO and R—NH$_2$. Incidentally, in the example shown in FIG. 4, the injection interval is made 3 seconds.

Figure 7A:
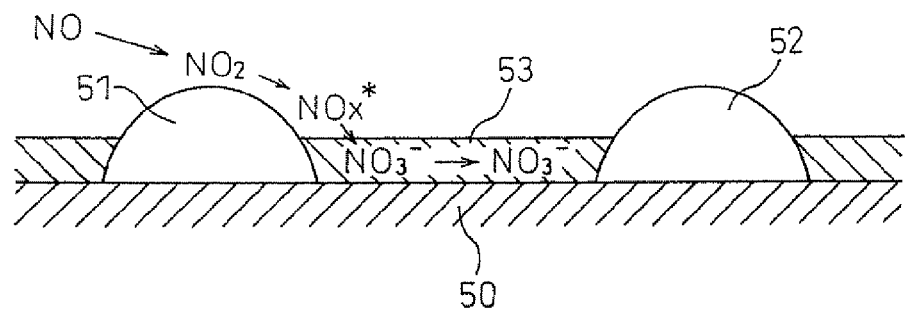
FIGS. 7A and 7B are views for explaining an oxidation reduction reaction in an exhaust purification catalyst.

If the vibration period of the hydrocarbon concentration, that is, the feed period of the hydrocarbons HC, is made longer than the above predetermined range of period, the reducing intermediates R—NCO and R—NH$_2$ disappear from the surface of the basic layer 53. At this time, the active NO$_X$* which is produced on the platinum Pt 53, as shown in FIG. 7A, diffuses in the basic layer 53 in the form of nitrate ions NO$_3^-$ and becomes nitrates. That is, at this time, the NO$_X$ in the exhaust gas is absorbed in the form of nitrates inside of the basic layer 53.

Figure 7B:
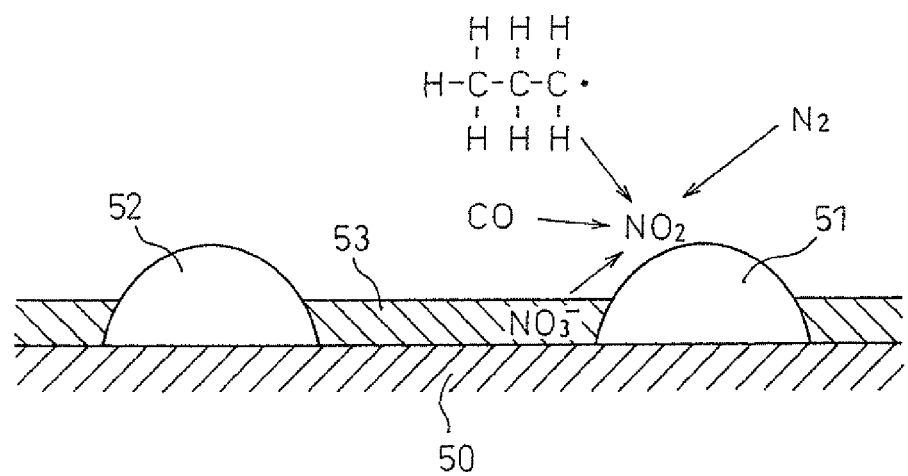

On the other hand, FIG. 7B shows the case where the air-fuel ratio of the exhaust gas which flows into the exhaust purification catalyst 13 is made the stoichiometric air-fuel ratio or rich when the NO is absorbed in the form of nitrates inside of the basic layer 53. In this case, the oxygen concentration in the exhaust gas falls, so the reaction proceeds in the opposite direction (NO$_3^-$→NO$_2$), and consequently the nitrates absorbed in the basic layer 53 successively become nitrate ions NO$_3^-$ and, as shown in FIG. 7B, are released from the basic layer 53 in the form of NO$_2$. Next, the released NO$_2$ is reduced by the hydrocarbons HC and CO contained in the exhaust gas.

Figure 8:
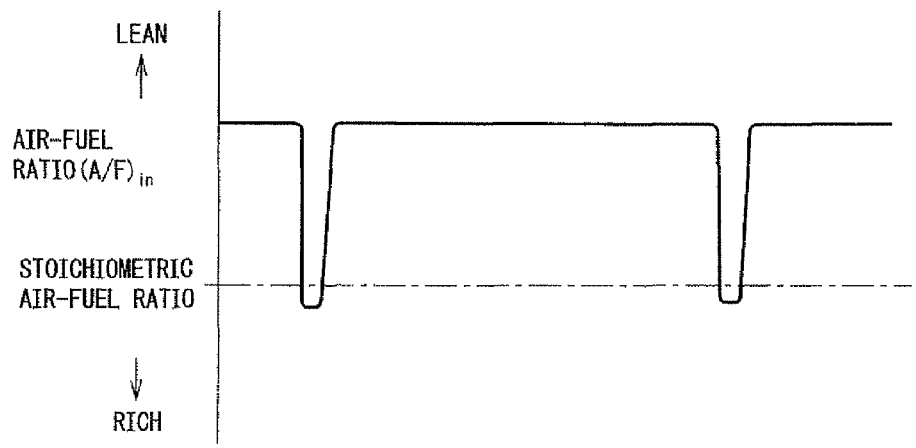
FIG. 8 is a view which shows changes in an air-fuel ratio of exhaust gas which flows into an exhaust purification catalyst.

FIG. 8 shows the case of making the air-fuel ratio (A/F)in of the exhaust gas which flows into the exhaust purification catalyst 13 temporarily rich slightly before the NO$_X$ absorption ability of the basic layer 53 becomes saturated. Note that, in the example shown in FIG. 8, the time interval of this rich control is 1 minute or more. In this case, the NO$_X$ which was absorbed in the basic layer 53 when the air-fuel ratio (A/F)in of the exhaust gas was lean is released all at once from the basic layer 53 and reduced when the air-fuel ratio (A/F)in of the exhaust gas is made temporarily rich. Therefore, in this case, the basic layer 53 plays the role of an absorbent for temporarily absorbing NO$_X$.

Note that, at this time, sometimes the basic layer 53 temporarily adsorbs the NO$_X$. Therefore, if using term of "storage" as a term including both "absorption" and "adsorption", at this time, the basic layer 53 performs the role of an NO$_X$ storage agent for temporarily storing the NO$_X$. That is, in this case, if the ratio of the air and fuel (hydrocarbons) which are supplied into the engine intake passage, combustion chambers 2, and upstream of the exhaust purification catalyst 13 in the exhaust passage is referred to as "the air-fuel ratio of the exhaust gas", the exhaust purification catalyst 13 functions as an NO$_X$ storage catalyst which stores the NO$_X$ when the air-fuel ratio of the exhaust gas is lean and releases the stored NO$_X$ when the oxygen concentration in the exhaust gas falls.

Figure 9:
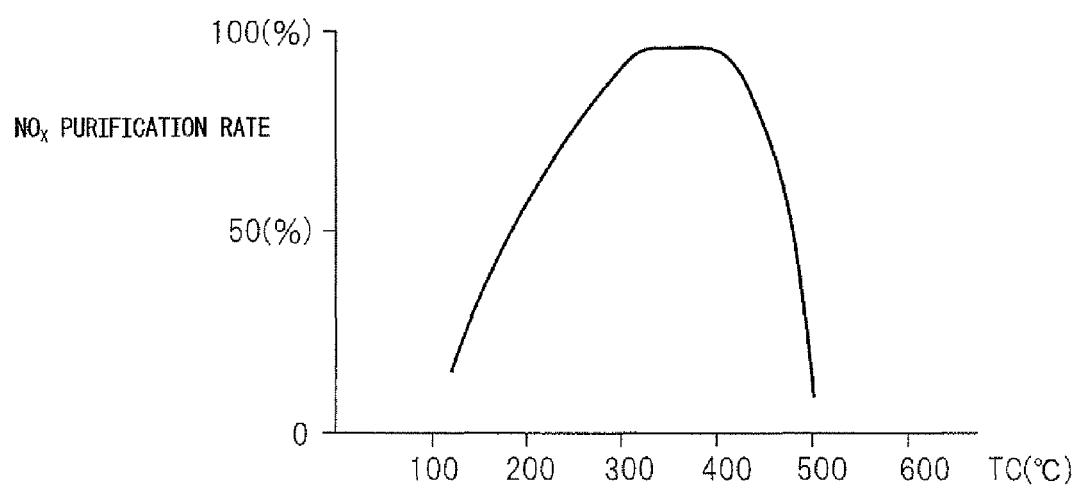
FIG. 9 is a view which shows an $NO_X$ purification rate.

FIG. 9 shows the NO$_X$ purification rate when making the exhaust purification catalyst 13 function as an NO$_X$ storage catalyst in this way. Note that, the abscissa of the FIG. 9 shows the catalyst temperature TC of the exhaust purification catalyst 13. When making the exhaust purification catalyst 13 function as an NO$_X$ storage catalyst, as shown in FIG. 9, when the catalyst temperature TC is 300° C. to 400° C., an extremely high NO$_X$ purification rate is obtained, but when the catalyst temperature TC becomes a 400° C. or higher high temperature, the NO$_X$ purification rate falls.

In this way, when the catalyst temperature TC becomes 400° C. or more, the NO$_X$ purification rate falls because if the catalyst temperature TC becomes 400° C. or more, the nitrates break down by heat and are released in the form of NO$_X$ from the exhaust purification catalyst 13. That is, so long as storing NO$_X$ in the form of nitrates, when the catalyst temperature TC is high, it is difficult to obtain a high NO$_X$ purification rate. However, in the new NO$_X$ purification method shown from FIG. 4 to FIGS. 6A and 6B, as will be understood from FIGS. 6A and 6S, nitrates are not formed or even if formed are extremely small in amount, consequently, as shown in FIG. 5, even when the catalyst temperature TC is high, a high NO$_X$ purification rate is obtained.

Therefore, in the present invention, a hydrocarbon feed valve 15 for feeding hydrocarbons is arranged in the engine exhaust passage, an exhaust purification catalyst 13 for reacting NO$_X$ contained in exhaust gas and reformed hydrocarbons is arranged in the engine exhaust passage downstream of the hydrocarbon feed valve 15, precious metal catalysts 51 and 52 are carried on the exhaust gas flow surfaces of the exhaust purification catalyst 13, basic exhaust gas flow surface parts 54 are formed around the precious metal catalysts 51 and 52, the exhaust purification catalyst 13 has the property of reducing the NO$_X$ which is contained in exhaust gas if the concentration of hydrocarbons which flow into the exhaust purification catalyst 13 is made to vibrate by within a predetermined range of amplitude and within a predetermined range of period and has the property being increased in storage amount of NO$_X$ which is contained in exhaust gas if the vibration period of the hydrocarbon concentration is made longer than this predetermined range, and, at the time of engine operation, the concentration of hydrocarbons which flow into the exhaust purification catalyst 13 is made to vibrate by within the predetermined range of amplitude and within the predetermined range of period to thereby reduce the NO$_X$ which is contained in the exhaust gas in the exhaust purification catalyst 13.

That is, the NO$_X$ purification method which is shown from FIG. 4 to FIGS. 6A and 6B can be said to be a new NO$_X$ purification method designed to remove NO$_X$ without forming almost any nitrates in the case of using an exhaust purification catalyst which carries precious metal catalysts and forms a basic layer which can absorb NO$_X$. In actuality, when using this new NO$_X$ purification method, the nitrates which are detected from the basic layer 53 become much smaller in amount compared with the case where making the exhaust purification catalyst 13 function as an $NO_X$ storage catalyst. Note that, this new $NO_X$ purification method will be referred to below as the "first $NO_X$ purification method".

Next, referring to FIG. 10 to FIG. 15, this first $NO_X$ purification method will be explained in a bit more detail.

Figure 10:
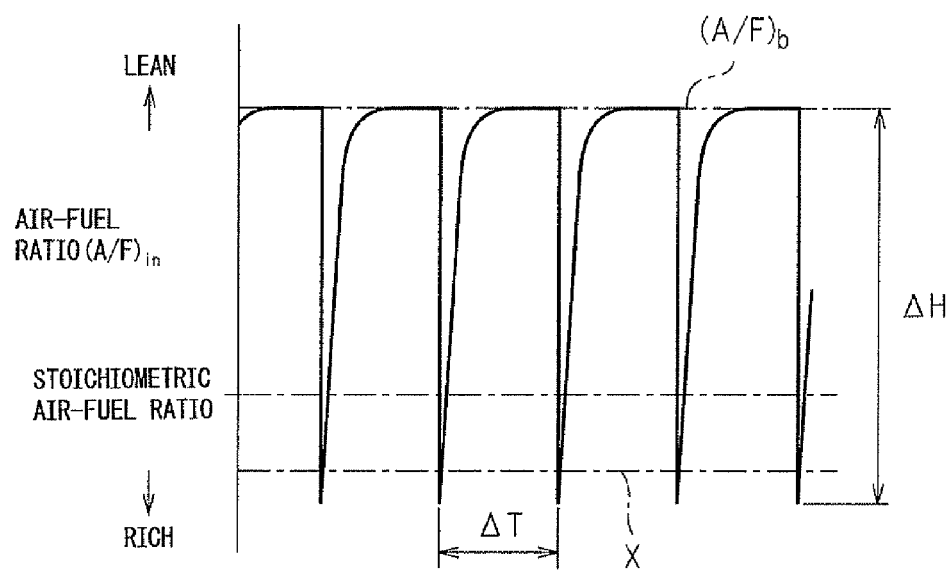
FIG. 10 is a time chart which shows changes in an air-fuel ratio of exhaust gas which flows into an exhaust purification catalyst.

FIG. 10 shows enlarged the change in the air-fuel ratio (A/F)in shown in FIG. 4. Note that, as explained above, the change in the air-fuel ratio (A/F)in of the exhaust gas which flows into this exhaust purification catalyst 13 simultaneously shows the change in concentration of the hydrocarbons which flow into the exhaust purification catalyst 13. Note that, in FIG. 10, ΔH shows the amplitude of the change in concentration of hydrocarbons HC which flow into the exhaust purification catalyst 13, while ΔT shows the vibration period of the concentration of the hydrocarbons which flow into the exhaust purification catalyst 13.

Furthermore, in FIG. 10, (A/F)b shows the base air-fuel ratio which shows the air-fuel ratio of the combustion gas for generating the engine output. In other words, this base air-fuel ratio (A/F)b shows the air-fuel ratio of the exhaust gas which flows into the exhaust purification catalyst 13 when stopping the feed of hydrocarbons. On the other hand, in FIG. 10, X shows the upper limit of the air-fuel ratio (A/F)in used for producing the reducing intermediates without the produced active $NO_X^*$ being stored in the form of nitrates inside the basic layer 53 much at all. To make the active $NO_X^*$ and the reformed hydrocarbons react to produce reducing intermediates, the air-fuel ratio (A/F)in has to be made lower than this upper limit X of the air-fuel ratio.

In other words, in FIG. 10, X shows the lower limit of the hydrocarbon concentration required for making the active $NO_X^*$ and reformed hydrocarbons react to produce reducing intermediates. To produce the reducing intermediates, the hydrocarbon concentration has to be made higher than this lower limit X. In this case, whether the reducing intermediates are produced is determined by the ratio of the oxygen concentration and hydrocarbon concentration around the active $NO_X^*$, that is, the air-fuel ratio (A/F)in. The upper limit X of the air-fuel ratio required for producing the reducing intermediates will below be called the "demanded minimum air-fuel ratio".

In the example shown in FIG. 10, the demanded minimum air-fuel ratio X is rich, therefore, in this case, to form the reducing intermediates, the air-fuel ratio (A/F)in is instantaneously made the demanded minimum air-fuel ratio X or less, that is, rich. As opposed to this, in the example shown in FIG. 11, the demanded minimum air-fuel ratio X is lean. In this case, the air-fuel ratio (A/F)in is maintained lean while periodically reducing the air-fuel ratio (A/F)in so as to form the reducing intermediates.

In this case, whether the demanded minimum air-fuel ratio X becomes rich or becomes lean depends on the oxidizing power of the exhaust purification catalyst 13. In this case, the exhaust purification catalyst 13, for example, becomes stronger in oxidizing power if increasing the carried amount of the precious metal 51 and becomes stronger in oxidizing power if strengthening the acidity. Therefore, the oxidizing power of the exhaust purification catalyst 13 changes due to the carried amount of the precious metal 51 or the strength of the acidity.

Figure 11:
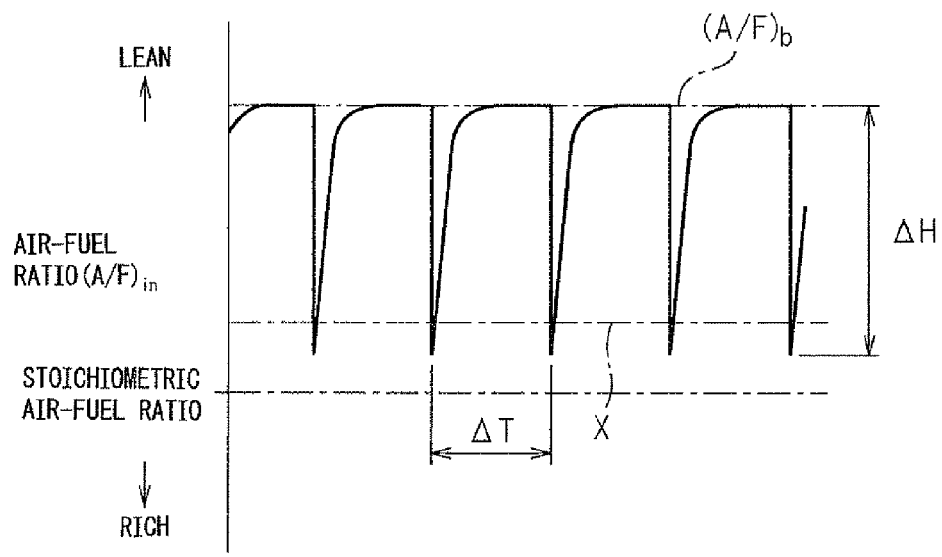
FIG. 11 is a time chart which shows changes in an air-fuel ratio of exhaust gas which flows into an exhaust purification catalyst.

Now, if using an exhaust purification catalyst 13 with a strong oxidizing power, as shown in FIG. 11, if maintaining the air-fuel ratio (A/F)in lean while periodically lowering the air-fuel ratio (A/F)in, the hydrocarbons end up becoming completely oxidized when the air-fuel ratio (A/F)in is reduced. As a result, reducing intermediates can no longer be produced. As opposed to this, when using an exhaust purification catalyst 13 with a strong oxidizing power, as shown in FIG. 10, if making the air-fuel ratio (A/F)in periodically rich, when the air-fuel ratio (A/F)in is made rich, part of the hydrocarbons will not be completely oxidized, but will be partially oxidized, that is, the hydrocarbons will be reformed, consequently reducing intermediates will be produced. Therefore, when using an exhaust purification catalyst 13 with a strong oxidizing power, the demanded minimum air-fuel ratio X has to be made rich.

On the other hand, when using an exhaust purification catalyst 13 with a weak oxidizing power, as shown in FIG. 11, if maintaining the air-fuel ratio (A/F)in lean while periodically lowering the air-fuel ratio (A/F)in, part of the hydrocarbons will not be completely oxidized, but will be partially oxidized, that is, the hydrocarbons will be reformed, and consequently reducing intermediates will be produced. As opposed to this, when using an exhaust purification catalyst 13 with a weak oxidizing power, as shown in FIG. 10, if making the air-fuel ratio (A/F)in periodically rich, a large amount of hydrocarbons will be exhausted from the exhaust purification catalyst 13 without being oxidized and consequently the amount of hydrocarbons which is wastefully consumed will increase. Therefore, when using an exhaust purification catalyst 13 with a weak oxidizing power, the demanded minimum air-fuel ratio X has to be made lean.

Figure 12:
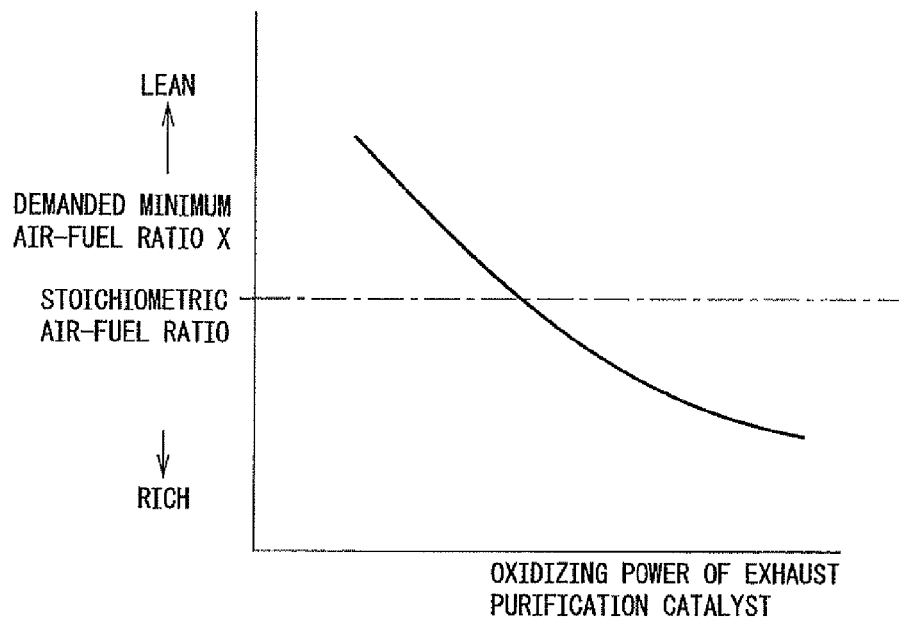
FIG. 12 is a view which shows a relationship between an oxidizing power of an exhaust purification catalyst and a demanded minimum air-fuel ratio X.

That is, it is learned that the demanded minimum air-fuel ratio X, as shown in FIG. 12, is reduced the stronger the oxidizing power of the exhaust purification catalyst 13. In this way, the demanded minimum air-fuel ratio X becomes lean or rich due to the oxidizing power of the exhaust purification catalyst 13. Below, taking as example the case where the demanded minimum air-fuel ratio X is rich, the amplitude of the change in concentration of hydrocarbons which flow into the exhaust purification catalyst 13 and the vibration period of the concentration of hydrocarbons which flow into the exhaust purification catalyst 13 will be explained.

Now, if the base air-fuel ratio (A/F)b becomes larger, that is, if the oxygen concentration in the exhaust gas before the hydrocarbons are fed becomes higher, the feed amount of hydrocarbons required for making the air-fuel ratio (A/F)in the demanded minimum air-fuel ratio X or less increases and along with this the excess amount of hydrocarbons which do not contribute to the production of the reducing intermediates also increases. In this case, to remove the $NO_X$ well, as explained above, it is necessary to make the excess hydrocarbons oxidize. Therefore, to remove the $NO_X$ well, the larger the amount of excess hydrocarbons, the larger the amount of oxygen which is required.

In this case, if raising the oxygen concentration in the exhaust gas, the amount of oxygen can be increased. Therefore, to remove the $NO_X$ well, when the oxygen concentration in the exhaust gas before the hydrocarbons are fed is high, it is necessary to raise the oxygen concentration in the exhaust gas after feeding the hydrocarbons. That is, the higher the oxygen concentration in the exhaust gas before the hydrocarbons are fed, the larger the amplitude of the hydrocarbon concentration has to be made.

Figure 13:
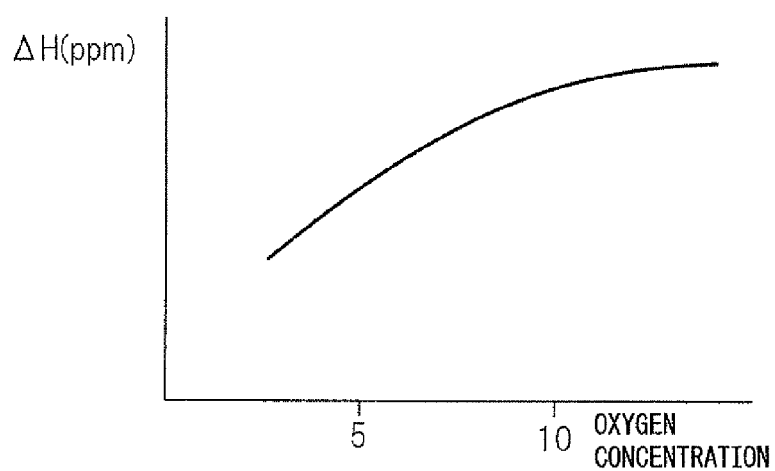
FIG. 13 is a view which shows a relationship between a concentration of oxygen in exhaust gas and an amplitude ΔH of hydrocarbon concentration which gives the same $NO_X$ purification rate.

FIG. 13 shows the relationship between the oxygen concentration in the exhaust gas before the hydrocarbons are fed and the amplitude ΔH of the hydrocarbon concentration when the same $NO_X$ purification rate is obtained. To obtain the same $NO_X$ purification rate from FIG. 13, it is learned that the higher the oxygen concentration in the exhaust gas before the hydrocarbons are fed, the greater the amplitude ΔH of the hydrocarbon concentration has to be made. That is, to obtain the same $NO_X$ purification rate, the higher the base air-fuel ratio $(A/F)b$, the greater the amplitude $\Delta T$ of the hydrocarbon concentration has to be made. In other words, to remove the $NO_X$ well, the lower the base air-fuel ratio $(A/F)b$, the more the amplitude $\Delta T$ of the hydrocarbon concentration can be reduced.

Figure 14:
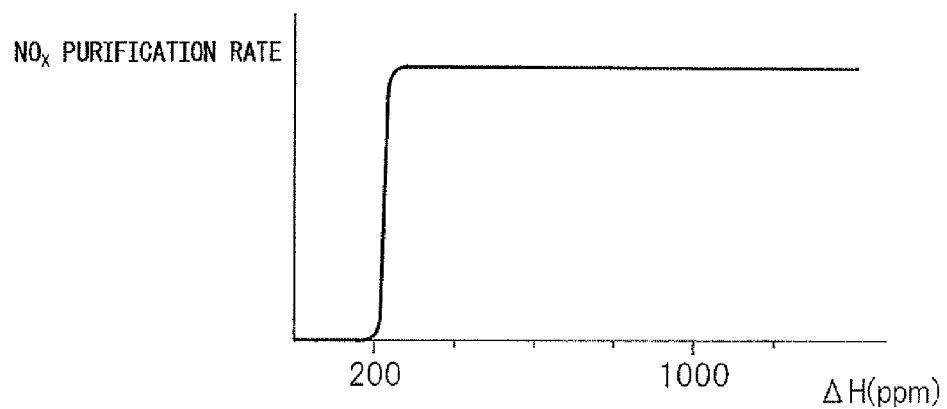
FIG. 14 is a view which shows a relationship between an amplitude ΔH of hydrocarbon concentration and an $NO_X$ purification rate.

In this regard, the base air-fuel ratio $(A/F)b$ becomes the lowest at the time of an acceleration operation. At this time, if the amplitude $\Delta H$ of the hydrocarbon concentration is about 200 ppm, it is possible to remove the $NO_X$ well. The base air-fuel ratio $(A/F)b$ is normally larger than the time of acceleration operation. Therefore, as shown in FIG. 14, if the amplitude $\Delta H$ of the hydrocarbon concentration is 200 ppm or more, an excellent $NO_X$ purification rate can be obtained.

On the other hand, it is learned that when the base air-fuel ratio $(A/F)b$ is the highest, if making the amplitude $\Delta H$ of the hydrocarbon concentration 10000 ppm or so, an excellent $NO_X$ purification rate is obtained. Therefore, in the present invention, the predetermined range of the amplitude of the hydrocarbon concentration is made 200 ppm to 10000 ppm.

Figure 15:
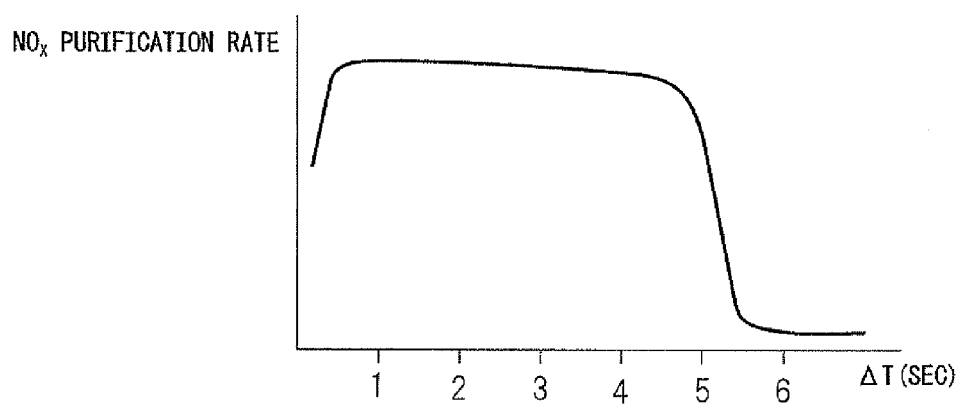
FIG. 15 is a view which shows a relationship between a vibration period ΔT of hydrocarbon concentration and an $NO_X$ purification rate.

Further, if the vibration period $\Delta T$ of the hydrocarbon concentration becomes longer, the time period where the oxygen concentration around the active $NO_X*$ becomes higher becomes longer in the time period after the hydrocarbons are fed to when the hydrocarbons are next fed. In this case, if the vibration period $\Delta T$ of the hydrocarbon concentration becomes longer than about 5 seconds, the active $NO_X*$ starts to be absorbed in the form of nitrates inside the basic layer 53. Therefore, as shown in FIG. 15, if the vibration period $\Delta T$ of the hydrocarbon concentration becomes longer than about 5 seconds, the $NO_X$ purification rate falls. Therefore, the vibration period $\Delta T$ of the hydrocarbon concentration has to be made 5 seconds or less.

On the other hand, if the vibration period $\Delta T$ of the hydrocarbon concentration becomes about 0.3 second or less, the fed hydrocarbons start to build up on the exhaust gas flow surfaces of the exhaust purification catalyst 13, therefore, as shown in FIG. 15, if the vibration period $\Delta T$ of the hydrocarbon concentration becomes about 0.3 second or less, the $NO_X$ purification rate falls. Therefore, in the present invention, the vibration period of the hydrocarbon concentration is made from 0.3 second to 5 seconds.

Figure 16A:
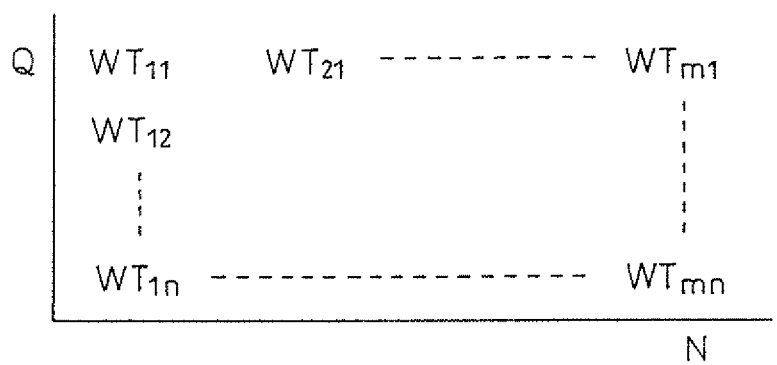
FIGS. 16A and 16B are views which show the injection time of hydrocarbons etc.
Figure 16B:
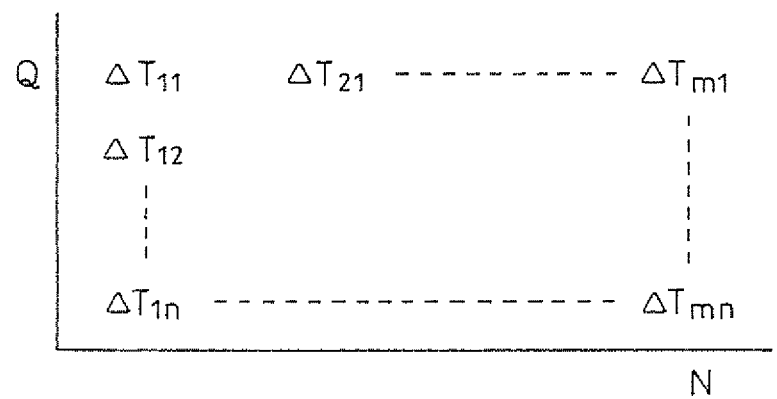

Now then, in this embodiment according to the present invention, control is performed so as to change the injection amount and injection timing of hydrocarbons from the hydrocarbon feed valve 15 so that the amplitude $\Delta H$ and vibration period $\Delta T$ of the hydrocarbon concentration become the optimal values for the engine operating state. In this case, in this embodiment according to the present invention, the optimum hydrocarbon injection amount WT which is able to give the amplitude $\Delta H$ of this optimal hydrocarbon concentration is stored as a function of the injection amount Q from fuel injectors 3 and the engine speed N in the form of a map such as shown in FIG. 16A in advance in the ROM 32. Further, the optimum injection period $\Delta T$ of hydrocarbons, that is, the injection period $\Delta T$ of the hydrocarbons, is also stored as a function of the injection amount Q from the fuel injectors 3 and the engine speed N in the form of a map such as shown in FIG. 16B in advance in the ROM 32.

Next, referring to FIG. 17 to FIG. 20, an $NO_X$ purification method when making the exhaust purification catalyst 13 function as an $NO_X$ storage catalyst will be explained specifically. The $NO_X$ purification method in the case of making the exhaust purification catalyst 13 function as an $NO_X$ storage catalyst in this way will be referred to below as the "second $NO_X$ purification method".

Figure 17:
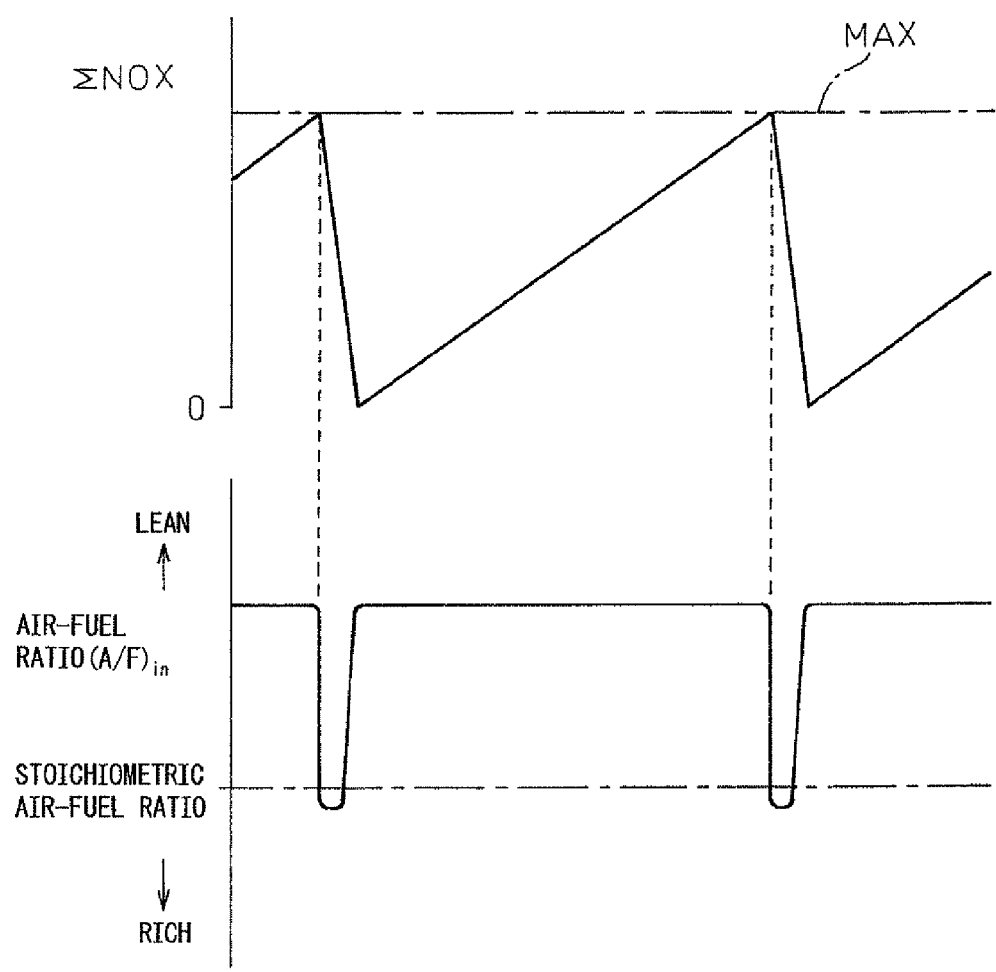
FIG. 17 is a view which shows changes in the air-fuel ratio of the exhaust gas which flows into an exhaust purification catalyst etc.

In this second $NO_X$ purification method, as shown in FIG. 17, when the stored $NO_X$ amount $\Sigma NO_X$ of $NO_X$ which is stored in the basic layer 53 exceeds a predetermined allowable amount MAX, the air-fuel ratio $(A/F)in$ of the exhaust gas flowing into the exhaust purification catalyst 13 is temporarily made rich. If the air-fuel ratio $(A/F)in$ of the exhaust gas is made rich, the $NO_X$ which was stored in the basic layer 53 when the air-fuel ratio $(A/F)in$ of the exhaust gas was lean is released from the basic layer 53 all at once and reduced. Due to this, the $NO_X$ is removed.

Figure 18:
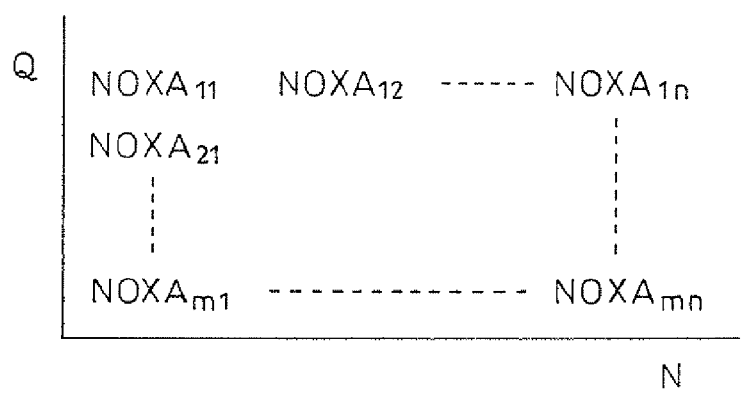
FIG. 18 is a view which shows a map of an exhausted $NO_X$ amount NOXA.

The stored $NO_X$ amount $\Sigma NO_X$ is, for example, calculated from the amount of $NO_X$ which is exhausted from the engine. In this embodiment according to the present invention, the exhausted $NO_X$ amount NOXA of $NO_X$ which is exhausted from the engine per unit time is stored as a function of the injection amount Q and engine speed N in the form of a map such as shown in FIG. 18 in advance in the ROM 32. The stored $NO_X$ amount $\Sigma NO_X$ is calculated from the exhausted $NO_X$ amount NOXA. In this case, as explained before, the period during which the air-fuel ratio $(A/F)in$ of the exhaust gas is made rich is usually 1 minute or more.

Figure 19:
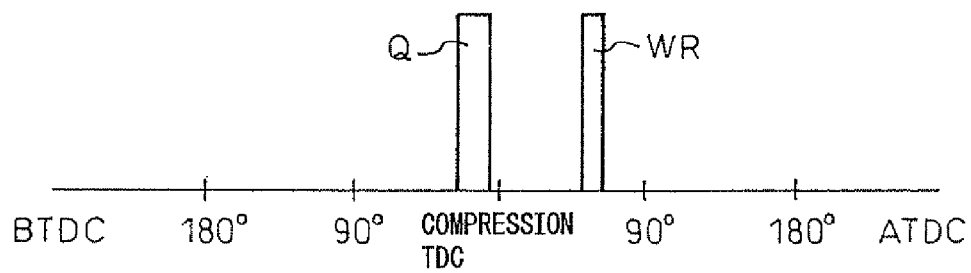
FIG. 19 is a view which shows a fuel injection timing.
Figure 20:
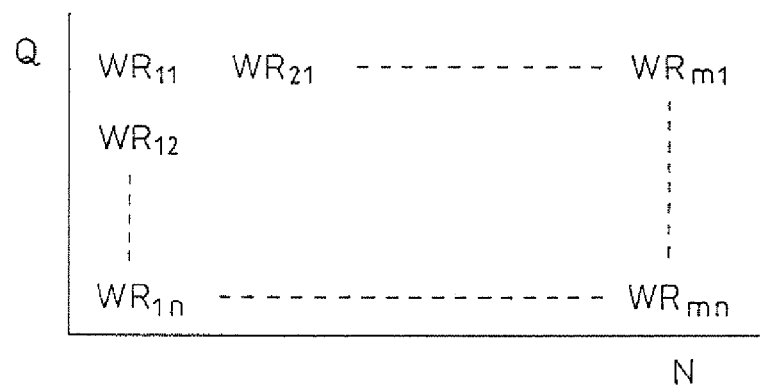
FIG. 20 is a view which shows a map of a hydrocarbon feed amount WR.

In this second $NO_X$ removal method, as shown in FIG. 19, in each combustion chamber 2, the fuel injector 3 injects additional fuel WR in addition to the combustion-use fuel Q so that the air-fuel ratio $(A/F)in$ of the exhaust gas which flows into the exhaust purification catalyst 13 is made rich. Note that, in FIG. 19, the abscissa indicates the crank angle. This additional fuel WR is injected at a timing at which it will burn, but will not appear as engine output, that is, slightly before ATDC90° after compression top dead center. This fuel amount WR is stored as a function of the injection amount Q and engine speed N in the form of a map such as shown in FIG. 20 in advance in the ROM 32. Of course, in this case, it is also possible to make the injection amount of hydrocarbons from the hydrocarbon feed valve 15 increase so as to make the air-fuel ratio $(A/F)in$ of the exhaust gas rich.

Figure 21:
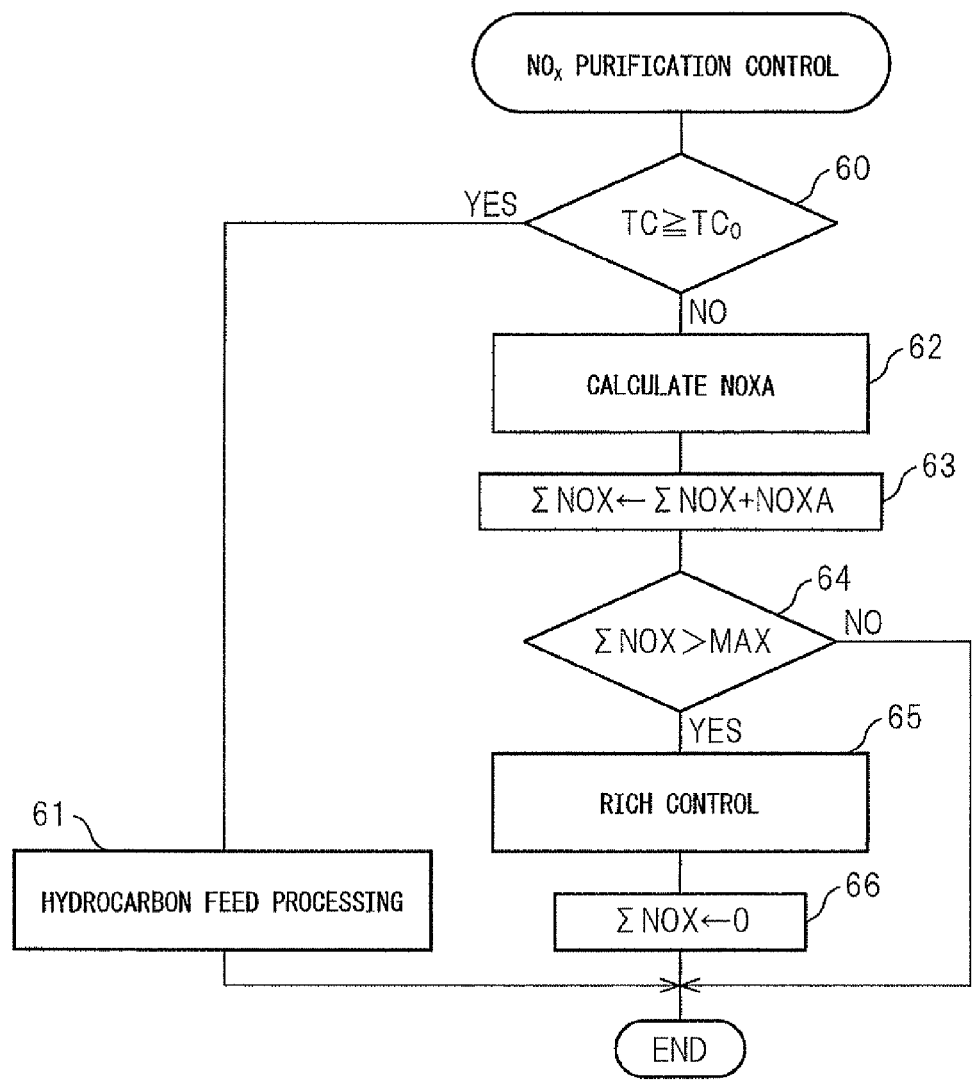
FIG. 21 is a flow chart for $NO_X$ purification control.

FIG. 21 shows an $NO_X$ purification control routine. This routine is executed by interruption every certain time period.

Referring to FIG. 21, first, at step 60, it is judged from the output signal of the temperature sensor 23 if the temperature TC of the exhaust purification catalyst 13 exceeds the activation temperature $TC_0$. When $TC \geq TC_0$, that is, when the exhaust purification catalyst 13 is activated, the routine proceeds to step 61 where the $NO_X$ purification action by the first $NO_X$ purification method is performed. That is, the injection time WT corresponding to the operating state is calculated from the map which is shown in FIG. 16A, the injection period $\Delta T$ corresponding to the operating state is calculated from the map which is shown in FIG. 16B, and hydrocarbons are injected from the hydrocarbon feed valve 15 in accordance with the calculated injection time WT and injection period $\Delta T$.

On the other hand, when it is judged at step 60 that $TC<TC_0$, that is, when the exhaust purification catalyst 13 is not activated, the routine proceeds to step 62 where the $NO_X$ purification action by the second $NO_X$ purification method is performed. That is, at step 62, the amount NOXA of $NO_X$ exhausted per unit time is calculated from the map which is shown in FIG. 18. Next, at step 63, the exhausted $NO_X$ amount NOXA is added to $\Sigma NO_X$ whereby the stored $NO_X$ amount $\Sigma NO_X$ is calculated. Next, at step 64, it is judged if the stored $NO_X$ amount $\Sigma NO_X$ exceeds the allowable value MAX. If $\Sigma NOX > MAX$, the routine proceeds to step 65 where the additional amount of fuel WR is calculated from the map which is shown in FIG. 20 and the action of injection of the additional fuel is performed. Next, at step 66, $\Sigma NO_X$ is cleared.

Now, as explained above, if using the first $NO_X$ purification method, even if the exhaust purification catalyst 13 becomes high in temperature, a high $NO_X$ purification rate can be obtained. The inventors engaged in repeated research regarding further raising the $NO_X$ purification rate when using the first $NO_X$ purification method and, as a result, found that the deposition ability of hydrocarbon molecules at the exhaust purification catalyst 13 has a great effect on improvement of the $NO_X$ purification rate. Therefore, first, this will be explained with reference to FIG. 22.

As explained above, when the $NO_X$ purification action by the first $NO_X$ purification method is being performed, if hydrocarbons are fed from the hydrocarbon feed valve 15, the hydrocarbons successively deposit over the entire exhaust purification catalyst 13. The radical hydrocarbons which are produced at this time react with the active $NO_X$* whereby the reducing intermediate is produced. This reducing intermediate deposits or is adsorbed at the surface of the basic layer 53. After this, if the hydrocarbons which are deposited around the reducing intermediate are made to oxidize and are consumed, and thereby the concentration of oxygen around the reducing intermediate rises, the reducing intermediate reacts with the active $NO_X$* or oxygen or breaks down itself to become $N_2$, $CO_2$, and $H_2O$, so the $NO_X$ is removed.

Now then, under the $NO_X$ purification action by the first $NO_X$ purification method, the $NO_X$ which is contained in the exhaust gas is held once in the form of a reducing intermediate on the exhaust purification catalyst 13 and then is removed. Therefore, to remove the $NO_X$ well, it is necessary to produce as much reducing intermediate as possible. In this case, the reducing intermediate is produced from the radical hydrocarbons, while the radical hydrocarbons are produced from the hydrocarbons which deposit on the exhaust purification catalyst 13, so to make the amount of production of the reducing intermediate increase, it is necessary to make as much hydrocarbons as possible deposit on the exhaust purification catalyst 13.

In this regard, the hydrocarbons which are fed from the hydrocarbon feed valve 15 are cracked if flowing into the exhaust purification catalyst 13. At this time, the number of carbon atoms of the hydrocarbon molecules becomes smaller and the number of hydrocarbon molecules increases. Such a cracking action of hydrocarbons is continued until the hydrocarbons flow through the inside of the exhaust purification catalyst 13. Therefore, as shown in FIG. 22, the number of carbon atoms of the hydrocarbon molecules inside the exhaust purification catalyst 13 becomes smaller the further downstream, while the number of hydrocarbon molecules increases the further downstream. In this case, the smaller the number of hydrocarbon molecules, the easier it is for the reducing intermediate to be produced. Further, only naturally, the larger the number of hydrocarbon molecules, the larger the amount of reducing intermediate produced. Therefore, to produce as much reducing intermediate as possible on the exhaust purification catalyst 13, as shown in FIG. 22, the further downstream of the exhaust purification catalyst 13, the higher the deposition ability of hydrocarbon molecules to the exhaust purification catalyst 13 has to be made.

Therefore, in the present invention, the exhaust purification catalyst 13 is formed so that the deposition ability of hydrocarbons to the downstream side part of the exhaust purification catalyst 13 becomes higher than the deposition ability of hydrocarbons to the upstream side part of the exhaust purification catalyst 13. In this case, as will be understood from FIG. 22, preferably, the further downstream of the exhaust purification catalyst 13, the higher the deposition ability of the hydrocarbons on the exhaust purification catalyst 13 is made.

Next, referring to FIG. 23A to FIG. 26B, various embodiments of the exhaust purification catalyst 13 designed to raise the deposition ability of hydrocarbons to the downstream side part of the exhaust purification catalyst 13 over the deposition ability of hydrocarbons to the upstream side part of the exhaust purification catalyst 13 will be successively explained.

Figure 23A:
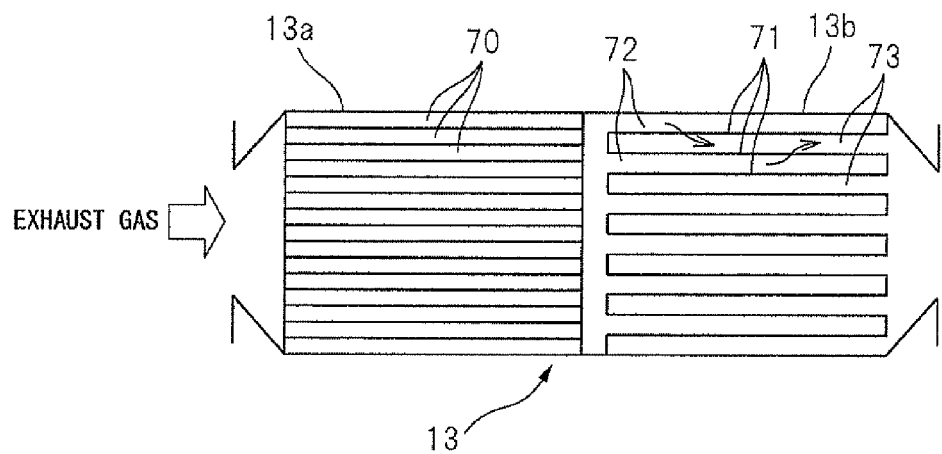
FIG. 23A is an enlarged view which shows one embodiment of the exhaust purification catalyst.
Figure 23B:
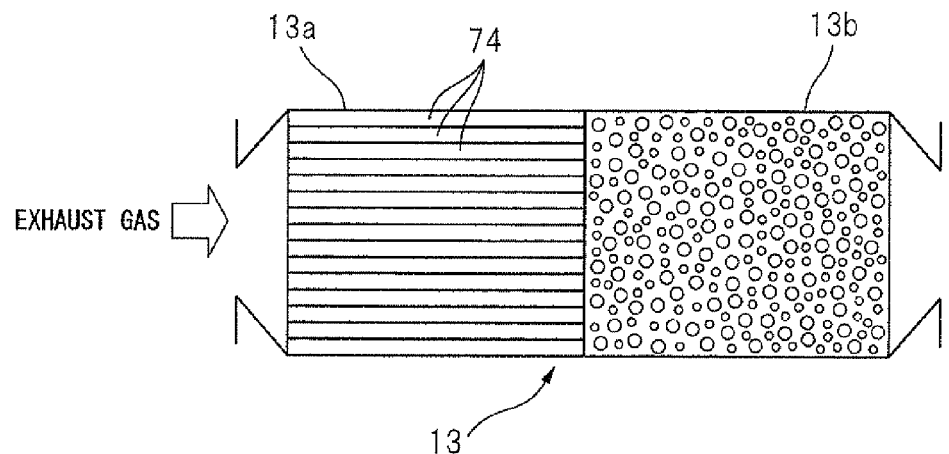
FIG. 23B is an enlarged view which shows one embodiment of the exhaust purification catalyst.
Figure 24:
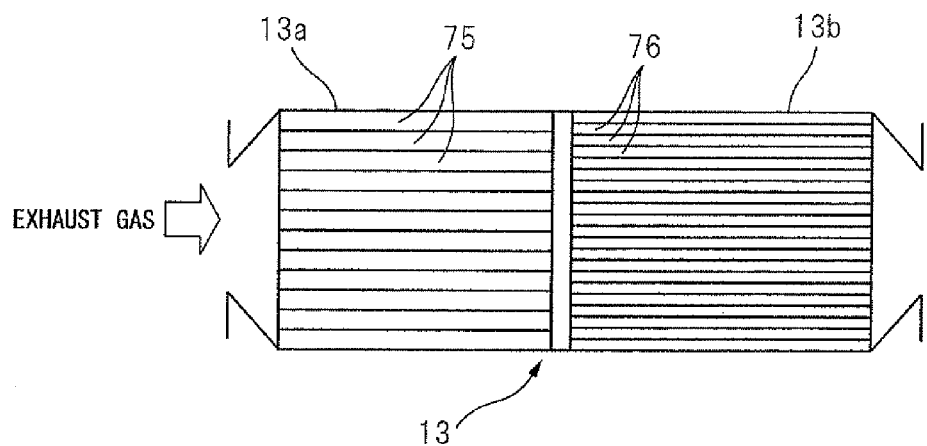
FIG. 24 is an enlarged view which shows one embodiment of the exhaust purification catalyst.

First, explaining FIGS. 23A and 23B and FIG. 24, these FIGS. 23A and 23B and 24 show embodiments where the structure of the downstream side part of the exhaust purification catalyst 13 is made a structure which has a higher deposition ability of hydrocarbons to the exhaust purification catalyst 13 compared with the structure of the upstream side part of the exhaust purification catalyst 13.

That is, in the embodiment which is shown in FIG. 23A, the exhaust purification catalyst 13 is comprised of the two catalysts of the upstream side catalyst 13a and the downstream side catalyst 13b. The substrates of the upstream side catalyst 13a and the downstream side catalyst 13b are for example formed from cordierite. The substrates of the upstream side catalyst 13a and the downstream side catalyst 13b carry a catalyst carrier comprised of for example alumina on them. As shown in FIG. 2, this catalyst carrier 50 carries precious metal catalysts 51 and 52 on it and is formed with the basic layer 53.

The upstream side catalyst 13a of the exhaust purification catalyst 13, as shown in FIG. 23A, is provided with a plurality of exhaust flow passages 70 which extend along the axial line of the exhaust purification catalyst 13. The exhaust gas flows through the insides of these exhaust flow passages 70 straight along the axial line of the exhaust purification catalyst 13. That is, the exhaust flow structure of the upstream side part of the exhaust purification catalyst 13 is a straight flow type where the exhaust gas flows through a plurality of exhaust flow passages which extend along the axial line of the exhaust purification catalyst 13.

On the other hand, in the embodiment which is shown in FIG. 23A, the downstream side catalyst 13b of the exhaust purification catalyst 13 has a honeycomb-shaped cross-sectional shape. This downstream side catalyst 13b is provided with a plurality of exhaust flow passages 72 and 73 which are separated by partition walls 71 and which extend along the axial line of the exhaust purification catalyst 13. The exhaust flow passages 72 and the exhaust flow passages 73 are alternately arranged across the partition walls 71. The exhaust flow passages 72 are opened at their upstream ends, while the exhaust flow passages 73 are opened at their downstream ends. Therefore, the exhaust gas which flows into the exhaust flow passages 72, as shown by the arrows, flows through the insides of the partition walls 71 and flows into the exhaust flow passages 73. That is, in the embodiment which is shown in FIG. 23A, the exhaust flow structure of the downstream side part of the exhaust purification catalyst 13 is the wall flow type where the exhaust gas flows through the insides of the partition walls 71 of the exhaust flow passages 72 and 73 which extend along the axial line of the exhaust purification catalyst 13.

Compared with the straight flow type of upstream side catalyst 13a, the wall flow type of downstream side catalyst 13b is higher in deposition ability of hydrocarbons to the exhaust purification catalyst 13. Therefore, in this embodiment, the deposition ability of hydrocarbons to the downstream side part of the exhaust purification catalyst 13 is made higher than the deposition ability of hydrocarbons to the upstream side part of the exhaust purification catalyst 13. Therefore, the amount of deposition of hydrocarbons to the exhaust purification catalyst 13 increases and, as a result, the amount of production of the reducing intermediate in the exhaust purification catalyst 13 increases, so the $NO_X$ purification rate is raised. Note that in this embodiment, the downstream side catalyst 13b is used as a particulate filter. Therefore, in this embodiment, the particulate filter 14 which is shown in FIG. 1 is omitted.

In the embodiment which is shown in FIG. 23B as well, the exhaust purification catalyst 13 is comprised of the two catalysts of the upstream side catalyst 13a and the downstream side catalyst 13b. The exhaust flow structure of the upstream side catalyst 13a is a straight flow type where the exhaust gas flows through a plurality of exhaust flow passages which extend along the axial line of the exhaust purification catalyst 13. The substrate of this upstream side catalyst 13a is also formed from cordierite. On the other hand, in this embodiment, the downstream side catalyst 13b of the exhaust purification catalyst 13 is comprised of an aggregate of pellets of a catalyst. Note that, the substrates of the upstream side catalyst 13a and pellet-shaped downstream side catalyst 13b carry a catalyst carrier which are comprised of for example alumina. As shown in FIG. 2, this catalyst carrier 50 carries the precious metal catalysts 51 and 52 and is formed with the basic layer 53.

In this embodiment as well, compared with a straight flow type of upstream side catalyst 13a, the pellet-shaped downstream side catalyst 13b is higher in deposition ability of hydrocarbons to the exhaust purification catalyst 13. Therefore, in this embodiment as well, the deposition ability of hydrocarbons to the downstream side part of the exhaust purification catalyst 13 is made higher than the deposition ability of hydrocarbons to the upstream side part of the exhaust purification catalyst 13. Therefore, the amount of deposition of hydrocarbons to the exhaust purification catalyst 13 increases and, as a result, the amount of production of the reducing intermediate at the exhaust purification catalyst 13 increases, so the $NO_X$ purification rate is raised.

In the embodiment which is shown in FIG. 24 as well, the exhaust purification catalyst 13 is comprised of the two catalysts of the upstream side catalyst 13a and the downstream side catalyst 13b. The substrates of these upstream side catalyst 13a and downstream side catalyst 13b are formed from for example cordierite. The substrates of the upstream side catalyst 13a and the downstream side catalyst 13b similarly carry a catalyst carrier which are comprised of for example alumina. As shown in FIG. 2, this catalyst carrier 50 carries the precious metal catalysts 51 and 52 and is formed with the basic layer 53.

In this embodiment, the exhaust flow structure of the upstream side catalyst 13a of the exhaust purification catalyst 13 is a straight flow type where the exhaust gas flows through a plurality of exhaust flow passages 75 which extend along the axial line of the exhaust purification catalyst 13, while the exhaust flow structure of the downstream side catalyst 13b of the exhaust purification catalyst 13 is also a straight flow type where the exhaust gas flows through a plurality of exhaust flow passages 76 which extend along the axial line of the exhaust purification catalyst 13. However, in this embodiment, as shown in FIG. 24, compared with the cross-sectional area of the exhaust flow passages 75 of the upstream side catalyst 13a, the cross-sectional area of the exhaust flow passages 76 of the downstream side catalyst 13b is formed smaller.

If in this way forming the cross-sectional area of the exhaust flow passages 76 of the downstream side part of the exhaust purification catalyst 13 smaller than the cross-sectional area of the exhaust flow passages 75 of the upstream side part of the exhaust purification catalyst 13, compared with the upstream side part, the downstream side part becomes higher in deposition ability of hydrocarbons to the exhaust purification catalyst 13. Therefore, the amount of deposition of hydrocarbons to the exhaust purification catalyst 13 increases and, as a result, the amount of production of the reducing intermediate at the exhaust purification catalyst 13 increases, so the $NO_X$ purification rate is raised.

Figure 25:
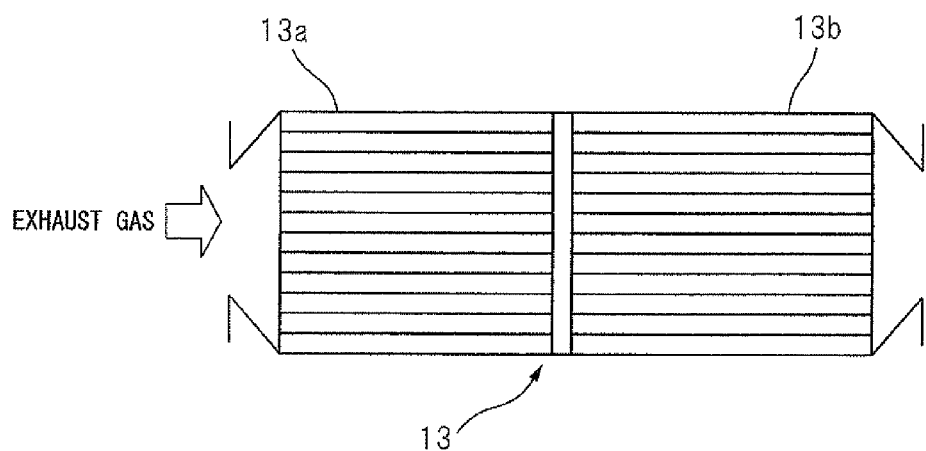
FIG. 25 is an enlarged view which shows one embodiment of the exhaust purification catalyst.

FIG. 25 shows an embodiment which uses, as the substrate of the downstream side part of the exhaust purification catalyst 13, a substrate where the deposition ability of hydrocarbons to the exhaust purification catalyst 13 becomes higher compared with the substrate of the upstream side part of the exhaust purification catalyst 1.

As shown in FIG. 25, in this embodiment as well, the exhaust purification catalyst 13 is comprised of the two catalysts of the upstream side catalyst 13a and the downstream side catalyst 13b. However, in this embodiment, a metal substrate which is comprised of a thin sheet of metal is used as the substrate of the upstream side catalyst 13a. As opposed to this, the substrate of the downstream side catalyst 13b is formed from a cordierite substrate, silicon carbide substrate, alumina-titanium substrate, or other ceramic substrate. The substrates of these upstream side catalyst 13a and downstream side catalyst 13b similarly, for example, carry a catalyst carrier comprised of alumina. As shown in FIG. 2, this catalyst carrier 50 carries precious metal catalysts 51 and 52 and is formed with the basic layer 53.

Compared with the case where the substrate of the exhaust purification catalyst 13 is formed from a metal substrate, formation from a cordierite substrate, silicon carbide substrate, alumina-titanium substrate, or other ceramic substrate results in a higher deposition ability of hydrocarbons at the exhaust purification catalyst 13. Therefore, in this embodiment as well, the deposition ability of hydrocarbons at the downstream side part of the exhaust purification catalyst 13 becomes higher than the deposition ability of hydrocarbons at the upstream side part of the exhaust purification catalyst 13. Therefore, the amount of deposition of hydrocarbons at the exhaust purification catalyst 13 increases and, as a result, the amount of production of the reducing intermediate at the exhaust purification catalyst 13 increases, so the $NO_X$ purification rate is raised.

Figure 26A:
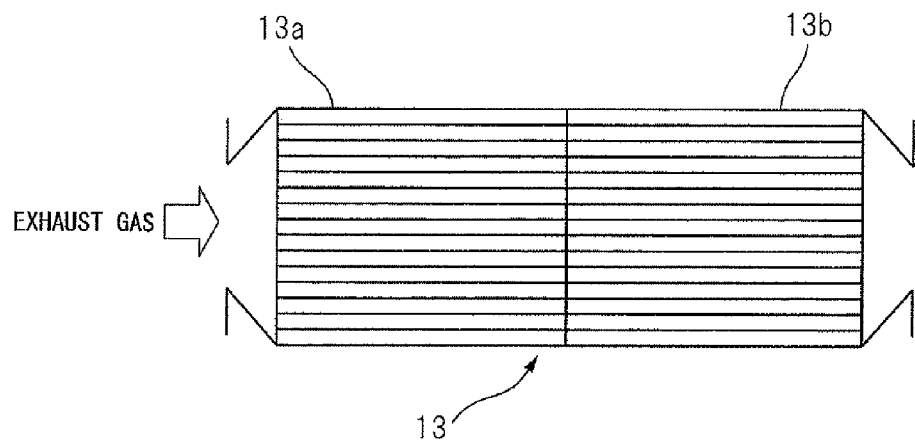
FIG. 26A is an enlarged view which shows one embodiment of the exhaust purification catalyst.
Figure 26B:
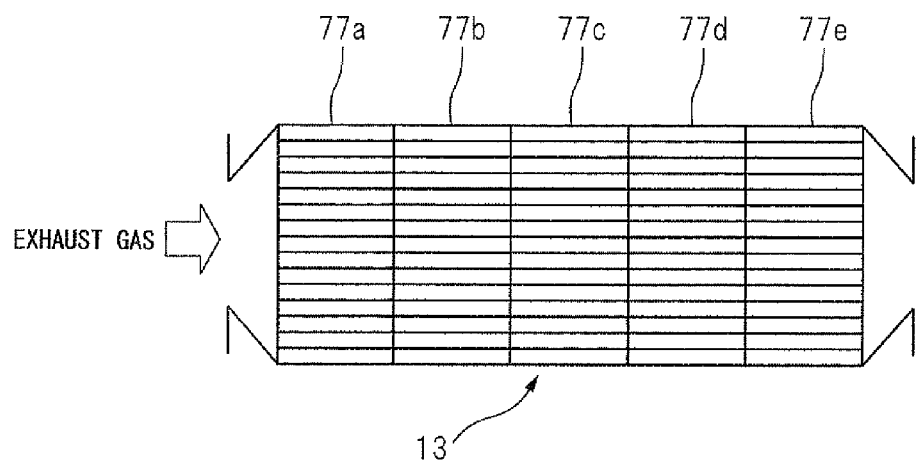
FIG. 26B is an enlarged view which shows one embodiment of the exhaust purification catalyst.

FIGS. 26A and 26B show embodiments which uses, as the catalyst composition of the downstream side part of the exhaust purification catalyst 13, a catalyst composition where the deposition ability of hydrocarbons to the exhaust purification catalyst 13 becomes higher compared with the upstream side part of the exhaust purification catalyst 13.

That is, in the embodiment which is shown in FIG. 26A, the exhaust purification catalyst 13 is comprised of an upstream side catalyst part 13a and a downstream side catalyst part 13b. The substrates of these upstream side catalyst part 13a and downstream side catalyst part 13b are, for example, formed from one piece of cordierite. Furthermore, in this embodiment, the substrate of the downstream side catalyst part 13b contains zeolite on it.

In this case, the substrate of the upstream side catalyst part 13a may also contain zeolite on it, but in this case, a larger amount of zeolite is contained on the substrate of the downstream side catalyst part 13b compared with the upstream side catalyst part 13a. Note that, in this embodiment as well, the substrates of the upstream side catalyst part 13a and the downstream side catalyst part 13b carry, for example, a catalyst carrier comprised of alumina. As shown in FIG. 2, this catalyst carrier 50 carries the precious metal catalysts 51 and 52 and is formed with the basic layer 53.

In this way, in this embodiment, the downstream side part of the exhaust purification catalyst 13 contains a larger amount of zeolite compared with the upstream side part of the exhaust purification catalyst 13 or only the downstream side part of the exhaust purification catalyst 13 contains zeolite. As is well known, zeolite has the function of adsorbing and holding a large amount of hydrocarbons. Therefore, if, in this way, making the downstream side part of the exhaust purification catalyst 13 contain a larger amount of zeolite compared with the upstream side part of the exhaust purification catalyst 13 or making only the downstream side part of the exhaust purification catalyst 13 contain zeolite, the downstream side part becomes higher in deposition ability of hydrocarbons to the exhaust purification catalyst 13 compared with the upstream side part. Therefore, the amount of deposition of hydrocarbons at the exhaust purification catalyst 13 increases and, as a result, the amount of production of the reducing intermediate at the exhaust purification catalyst 13 increases, so the $NO_X$ purification rate is raised.

In the embodiment which is shown in FIG. 26B, the exhaust purification catalyst 13 is comprised from the plurality of catalyst parts 77a to 77e, while the substrates of these catalyst parts 77a to 77b are formed from a single piece of cordierite. This substrate carries a catalyst carrier which is comprised of alumina. As shown in FIG. 2, this catalyst carrier 50 carries the precious metal catalysts 51 and 52 and is formed with the basic layer 53.

In this embodiment, the content of alumina is made to gradually increase from the upstream side toward the downstream side. That is, the content of alumina is made to gradually increase from the catalyst part 77a to the catalyst part 77b, catalyst part 77c, catalyst part 77d, and catalyst part 77e in that order. Therefore, in this embodiment, the downstream side part of the exhaust purification catalyst 13 contains a larger amount of alumina compared with the upstream side part of the exhaust purification catalyst 13.

If the content of alumina increases, the specific surface area of the catalyst carrier increases. Therefore, the greater the content of alumina, the higher the deposition ability of hydrocarbons at the exhaust purification catalyst 13. Therefore, in this embodiment, the downstream side part becomes higher in deposition ability of hydrocarbons to the exhaust purification catalyst 13 compared with the upstream side part. Therefore, in this embodiment as well, the amount of deposition of hydrocarbons at the exhaust purification catalyst 13 increases and, as a result, the amount of production of the reducing intermediate at the exhaust purification catalyst 13 increases, so the $NO_X$ purification rate is raised.

Note that, as another embodiment, it is also possible to arrange an oxidation catalyst for reforming the hydrocarbons upstream of the exhaust purification catalyst 13 inside of the engine exhaust passage.

REFERENCE SIGNS LIST

4. intake manifold
5. exhaust manifold
7. exhaust turbocharger
12. exhaust pipe
13. exhaust purification catalyst
14. particulate filter
15. hydrocarbon feed valve

The invention claimed is:

1. An exhaust purification system of an internal combustion engine comprising:
   an engine exhaust gas passage;
   a hydrocarbon feed valve for feeding hydrocarbons arranged in the engine exhaust passage;
   an exhaust purification catalyst for reacting $NO_X$ contained in an exhaust gas and reformed hydrocarbons arranged in the engine exhaust passage downstream of the hydrocarbon feed valve;
   precious metal catalysts carried on exhaust gas flow surfaces of the exhaust purification catalyst;
   basic exhaust gas flow surface parts formed around the precious metal catalysts; and
   an electronic control unit, wherein the electronic control unit is configured to control a vibration of a concentration of hydrocarbons flowing into the exhaust purification catalyst within a predetermined range of amplitude and within a predetermined range of period, and is configured to control the vibration period of the hydrocarbon concentration longer than the predetermined range of period, wherein
      when the electronic control unit controls the vibration of the concentration of hydrocarbons flowing into the exhaust purification catalyst within the predetermined range of amplitude and within the a predetermined range of period, the $NO_X$ contained in the exhaust gas and the reformed hydrocarbons react on at least a portion of the precious metal catalysts to produce a reducing intermediate containing nitrogen and hydrocarbons, at least a portion the produced reducing intermediate is held on at least a portion of the basic exhaust gas flow surface parts, the $NO_x$ contained in the exhaust gas catalyst is chemically reduced by a reducing action of the reducing intermediate held on the basic exhaust gas flow surface parts in the exhaust purification catalyst, and the exhaust purification catalyst has a property of chemically reducing the $NO_X$ that is contained in the exhaust gas without storing, or storing a fine amount of nitrates in the basic exhaust gas flow surface parts,
      when the electronic control unit controls the vibration period of the hydrocarbon concentration longer than the predetermined range of period, the exhaust purification catalyst has a property of being increased in storage amount of $NO_X$ that is contained in the exhaust gas,
      the electronic control unit is configured to control, when needed, an injection amount of hydrocarbons from the hydrocarbon feed valve so that an amplitude of a change of concentration of hydrocarbons that flow into the exhaust purification catalyst becomes within the predetermined range of amplitude, and is configured to control, when needed, an injection period of hydrocarbons from the hydrocarbon feed valve so that the concentration of hydrocarbons that flow into the exhaust purification catalyst becomes within the predetermined range of period, and
      the exhaust purification catalyst is formed such that a deposition ability of hydrocarbons to a downstream side part of the exhaust purification catalyst is higher than a deposition ability of hydrocarbons to an upstream side part of the exhaust purification catalyst.

2. The exhaust purification system of an internal combustion engine as claimed in claim 1, wherein the downstream side part of the exhaust purification catalyst comprises a structure that has a higher deposition ability of hydrocarbons to the exhaust purification catalyst compared to a structure of the upstream side part of the exhaust purification catalyst.

3. The exhaust purification system of an internal combustion engine as claimed in claim 2, wherein the upstream side part of the exhaust purification catalyst is formed such that the exhaust gas flows through an inside of a plurality of exhaust flow passages that extend in an axial line of the exhaust purification catalyst, and the downstream side part of the exhaust purification catalyst is formed such that the exhaust gas flows through an inside of partition walls of the exhaust flow passages that extend in an axial line of the exhaust purification catalyst.

4. The exhaust purification system of an internal combustion engine as clamed in claim 2, wherein the upstream side part of the exhaust purification catalyst is formed such that the exhaust gas flows through an inside of a plurality of exhaust flow passages that extend in an axial line of the exhaust purification catalyst, and the downstream side part of the exhaust purification catalyst is comprised of an aggregate of pellet-shaped catalyst.

5. The exhaust purification system of an internal combustion engine as claimed in claim 2, wherein the upstream side part of the exhaust purification catalyst and the downstream side part of the exhaust purification catalyst are provided with pluralities of exhaust flow passages that extend in an axial line of the exhaust purification catalyst, and a cross-sectional area of the exhaust flow passages of the downstream side part of the exhaust purification catalyst is made smaller compared to a cross-sectional area of the exhaust flow passages of the upstream side part of the exhaust purification catalyst.

6. The exhaust purification system of an internal combustion engine as claimed in claim 1, wherein the downstream side part of the exhaust purification catalyst comprises a substrate that has a deposition ability of hydrocarbons that is higher than a substrate of the upstream side part of the exhaust purification catalyst.

7. The exhaust purification system of an internal combustion engine as claimed in claim 6, wherein the substrate of the upstream side part of the exhaust purification catalyst comprises a metal substrate, and the substrate of the downstream side part of the exhaust purification catalyst comprises a cordierite substrate.

8. The exhaust purification system of an internal combustion engine as claimed in claim 1, wherein a catalyst composition of the downstream side part of the exhaust purification catalyst has a higher deposition ability of hydrocarbons compared to the upstream side part of the exhaust purification catalyst.

9. The exhaust purification system of an internal combustion engine as claimed in claim 8, wherein the downstream side part of the exhaust purification catalyst contains a larger amount of zeolite compared to the upstream side part of the exhaust purification catalyst.

10. The exhaust purification system of an internal combustion engine as claimed in claim 9, wherein only the downstream side part of the exhaust purification catalyst contains zeolite.

11. The exhaust purification system of an internal combustion engine as claimed in claim 8, wherein the downstream side part of the exhaust purification catalyst contains a larger amount of alumina compared to the upstream side part of the exhaust purification catalyst.

12. The exhaust purification system of an internal combustion engine as claimed in claim 11, wherein the predetermined injection period of the hydrocarbons is between 0.3 second to 5 seconds.

13. The exhaust purification system of an internal combustion engine as claimed in claim 1, wherein the injection period of the hydrocarbons is a period that is necessary for continuing to produce the reducing intermediate.

14. The exhaust purification system of an internal combustion engine as claimed in claim 1, wherein the precious metal catalysts are comprised of at least one of platinum (Pt), rhodium (Rh), and/or palladium (Pd).

15. The exhaust purification system of an internal combustion engine as claimed in claim 1, wherein basic layers that contain alkali metals, alkali earth metals, rare earths, and/or metals that can donate electrons to $NO_x$ are formed on the exhaust gas flow surfaces of the exhaust purification catalyst, and the surfaces of the basic layers form the basic exhaust gas flow surfaces.

* * * * *